(12) United States Patent
Yokohama et al.

(10) Patent No.: US 8,100,504 B2
(45) Date of Patent: Jan. 24, 2012

(54) INKJET RECORDING APPARATUS AND INKJET RECORDING METHOD

(75) Inventors: Yuuki Yokohama, Atsugi (JP); Tomohiro Inoue, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 625 days.

(21) Appl. No.: 12/280,865

(22) PCT Filed: Feb. 27, 2007

(86) PCT No.: PCT/JP2007/054125
§ 371 (c)(1),
(2), (4) Date: Aug. 27, 2008

(87) PCT Pub. No.: WO2007/100121
PCT Pub. Date: Sep. 7, 2007

(65) Prior Publication Data
US 2009/0041940 A1    Feb. 12, 2009

(30) Foreign Application Priority Data
Feb. 27, 2006    (JP) .................................. 2006-049465

(51) Int. Cl.
*B41J 2/14*    (2006.01)
*B41J 2/165*    (2006.01)
(52) U.S. Cl. ............................................ 347/47; 347/29
(58) Field of Classification Search ................... 347/47, 347/100, 29
See application file for complete search history.

(56) References Cited

U.S. PATENT DOCUMENTS
| | | | |
|---|---|---|---|
| 6,436,180 | B1 | 8/2002 | Ma et al. |
| 2003/0092862 | A1 | 5/2003 | Thomas et al. |
| 2003/0109662 | A1 | 6/2003 | Medsker et al. |
| 2004/0048957 | A1 | 3/2004 | Medsker et al. |
| 2004/0242804 | A1 | 12/2004 | Medsker et al. |

FOREIGN PATENT DOCUMENTS
| | | | |
|---|---|---|---|
| JP | 2001 335725 | | 12/2001 |
| JP | 2004 535485 | | 11/2004 |
| JP | 2005 138383 | | 6/2005 |
| JP | 2005-138383 | * | 6/2005 |
| JP | 2006 45436 | | 2/2006 |
| JP | 2006-045436 | * | 2/2006 |

OTHER PUBLICATIONS

Office Action issued Jul. 23, 2010, in Singapore Patent Application No. 0806332-3.

Edward M. Petrie, "Handbook of Adhesives and Sealants", McGraw-Hill, ISBN 0-07-049888-1, Chapter 2, Oct. 2000, pp. 49-56 (with an additional page).

* cited by examiner

*Primary Examiner* — Geoffrey Mruk
(74) *Attorney, Agent, or Firm* — Oblon, Spivak, McClelland, Maier & Neustadt, L.L.P.

(57) ABSTRACT

The present invention aims to obtain a highly reliable inkjet recording apparatus using a nozzle plate which is excellent not only in ink repellency at the initial stage of the lifetime thereof but also excellent in mechanical durability against wiping, and the like. For this end, the present invention provides an inkjet recording apparatus which is equipped with at least an ink flying unit configured to fly an inkjet recording ink by applying an impulse to the inkjet recording ink to form an image, wherein the nozzle plate surface of an inkjet head in the ink flying unit has an ink repellent layer containing a silicone resin; and the inkjet recording ink contains at least a pigment, water, a fluorochemical surfactant, and a nonionic surfactant.

9 Claims, 11 Drawing Sheets

INKJET RECORDING APPARATUS AND INKJET RECORDING METHOD

TECHNICAL FIELD

The present invention relates to an inkjet recording apparatus and an inkjet recording method.

BACKGROUND ART

With the enhancement of speeding-up performance of printers for office automation and high-quality imaging technologies, requirements for print quality, color tint, color saturation, and glossiness have become more severe.

As a result, in order to enhance color developing ability of a recording ink by reducing the surface tension of the recording ink and increasing the wetting property of the recording ink to paper, the present inventors proposed to use a silicone resin for an ink repellent layer of a nozzle plate in an inkjet nozzle (see Patent Literature 1).

Owing to the proposal, the color developing ability of an ink was substantially improved, however, it is required to make recording inks excellent not only ink in ink repellency at the initial stage of the lifetime thereof but also excellent in mechanical durability against wiping and the like in response to speeding up of performance and increased frequency of use of printers. However, when a conventional ink is used, the performance of an ink repellent layer formed with a silicone resin is far from satisfactory.

Patent Literature 1 Japanese Patent Application Laid-Open (JP-A) No. 2005-138383

DISCLOSURE OF INVENTION

The present invention aims to provide a highly reliable inkjet recording apparatus using a nozzle plate which is excellent not only in ink repellency at the initial stage of the lifetime thereof but also excellent in mechanical durability against wiping and the like in an inkjet nozzle and to provide an inkjet recording method.

The means to solve aforesaid problems are as follows.

<1> An inkjet recording apparatus having an ink flying unit configured to fly an inkjet recording ink by applying an impulse to the inkjet recording ink to form an image, wherein the nozzle plate surface of an inkjet head in the ink flying unit has an ink repellent layer containing a silicone resin, and the inkjet recording ink contains at least a pigment, water, a fluorochemical surfactant, and a nonionic surfactant.

<2> The inkjet recording apparatus according to the item <1>, wherein the nonionic surfactant is a compound represented by the following Formula (1):

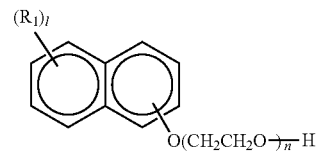

Formula (1)

where $R_1$ represents an alkyl group, an allyl group, or an aralkyl group each having 1 to 20 carbon atoms, "l" is an integer of 0 to 7, and "n" is an integer of 20 to 200.

<3> The inkjet recording apparatus according to any one of the items <1> to <2>, wherein the nonionic surfactant is polyoxyethylene (n=40) β-naphthyl ether.

<4> The inkjet recording apparatus according to any one of the items <1> to <3>, wherein the fluorochemical surfactant contains a compound represented by the following Formula (2):

Formula (2)

where "m" is an integer of 0 to 10, and "n" is an integer of 0 to 40.

<5> The inkjet recording apparatus according to any one of the items <1> to <3>, wherein the fluorochemical surfactant contains a compound represented by the following Formula (3):

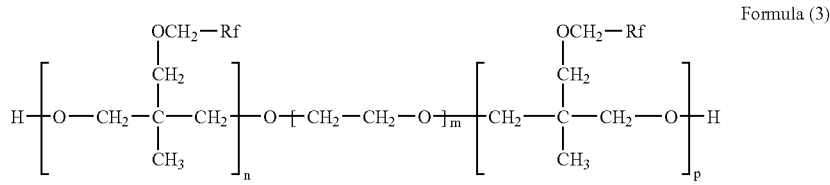

Formula (3)

where Rf represents a fluorine containing group, and "m", "n", and "p" are respectively an integer of one or more.

<6> The inkjet recording apparatus according to any one of the items <1> to <5>, wherein the inkjet recording ink contains a resin emulsion.

<7> The inkjet recording apparatus according to the item <6>, wherein the resin emulsion contains at least one selected from polyurethane resin emulsions, styrene-acrylic resin emulsions, and acrylic silicone resin emulsions.

<8> The inkjet recording apparatus according to the item <7>, wherein the polyurethane resin emulsion is a self-emulsifiable anionic ether-based polyurethane resin emulsion.

<9> The inkjet recording apparatus according to any one of the items <1> to <8>, wherein the ink repellent layer has a surface roughness (Ra) of 0.2 μm or less.

<10> The inkjet recording apparatus according to any one of the items <1> to <9>, wherein the ink repellent layer has a thickness of 0.1 μm to 5.0 μm.

<11> The inkjet recording apparatus according to any one of the items <1> to <10>, wherein the ink repellent layer has a critical surface tension of 5 mN/m to 40 mN/m.

<12> An inkjet recording method which includes flying an inkjet recording ink by applying an impulse to the inkjet recording ink to form an image, wherein the nozzle plate of an inkjet head used in the flying of the inkjet recording ink has an ink repellent layer containing a silicone resin; and the inkjet recording ink contains at least a pigment, water, a fluorochemical surfactant, and a nonionic surfactant.

<13> The inkjet recording method according to the item <12>, wherein the nonionic surfactant is a compound represented by the following Formula (1):

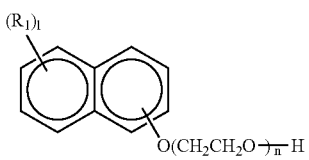

Formula (1)

where $R_1$ represents an alkyl group, an allyl group, or an aralkyl group each having 1 to 20 carbon atoms, "l" is an integer of 0 to 7, and "n" is an integer of 20 to 200.

<14> The inkjet recording method according to any one of the items <12> to <13>, wherein the nonionic surfactant is polyoxyethylene (n=40) β-naphthyl ether.

<15> The inkjet recording method according to any one of the items <12> to <14>, wherein the fluorochemical surfactant contains a compound represented by the following Formula (2):

$$CF_3CF_2(CF_2CF_2)_m\text{—}CH_2CH_2O(CH_2CH_2O)_nH \qquad \text{Formula (2)}$$

where "m" is an integer of 0 to 10, and "n" is an integer of 0 to 40.

<16> The inkjet recording method according to any one of the items <12> to <14>, wherein the fluorochemical surfactant contains a compound represented by the following Formula (3):

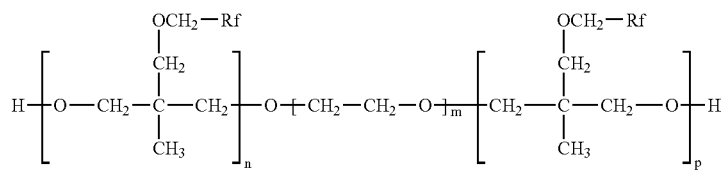

Formula (3)

where Rf represents a fluorine containing group, and "m", "n", and "p" are respectively an integer of one or more.

<17> The inkjet recording method according to any one of the items <12> to <16>, wherein the inkjet recording ink contains a resin emulsion.

<18> The inkjet recording method according to the item <17>, wherein the resin emulsion contains at least one selected from polyurethane resin emulsions, styrene-acrylic resin emulsions, and acrylic silicone resin emulsions.

<19> The inkjet recording method according to the item <18>, wherein the polyurethane resin emulsion is a self-emulsifiable anionic ether-based polyurethane resin emulsion.

The inkjet recording apparatus according to the present invention is equipped with at least an ink flying unit; in the ink flying unit, the nozzle plate surface of an inkjet head has an ink repellent layer containing a silicone resin, and the inkjet recording ink contains at least a pigment, water, a fluorochemical surfactant, and a nonionic surfactant. With this configuration, it is possible to provide a highly reliable inkjet recording apparatus using a nozzle plate which is excellent not only in ink repellency at the initial stage of the lifetime thereof but also excellent in mechanical durability against wiping and the like.

The reason is not clearly known, however, it is conceivable that the use of a nonionic surfactant as a dispersing agent allows for reducing adhesion of a pigment to the nozzle plate and reducing damages of the ink repellent layer by the pigment adhered on the nozzle plate during wiping. In addition, it is conceivable that by stabilizing dispersion of the pigment in the ink using a nonionic surfactant, the particle diameter and the range of particle size distribution of the pigment can be made smaller, and the amount of coarse particles of the pigment in the ink can be reduced, thereby damages of the ink repellent layer caused by friction of coarse particles in the ink during wiping can be reduced.

When the nonionic surfactant is a compound having a structure represented by Formula (1), it is effective in reducing damages of the ink repellent layer because the average particle diameter of the pigment and the range of the particle side distribution of the pigment can be reduced.

When the nonionic surfactant represented by Formula (1) is polyoxyethylene (n=40) β-naphthyl ether, it is particularly effective in reducing such damages.

When the fluorochemical surfactant in the ink is a compound having a structure represented by Formula (2) or Formula (3), it is effective because of the large reduction in ink repellency.

When the inkjet recording ink contains a resin emulsion, the durability of the silicone layer is reduced due to increased ink adhesion to the silicone layer, and thus it is effective to enhance the durability of silicone by using the inkjet recording apparatus of the present invention.

In such a case, it is effective to use a resin emulsion containing at least one selected from polyurethane resin emulsions, styrene-acrylic resin emulsions, and acrylic silicone resin emulsions.

In addition, it is further effective when the polyurethane resin emulsion is a self-emulsifiable anionic ether-based polyurethane resin emulsion.

BEST MODE FOR CARRYING OUT THE INVENTION

Figure 1:
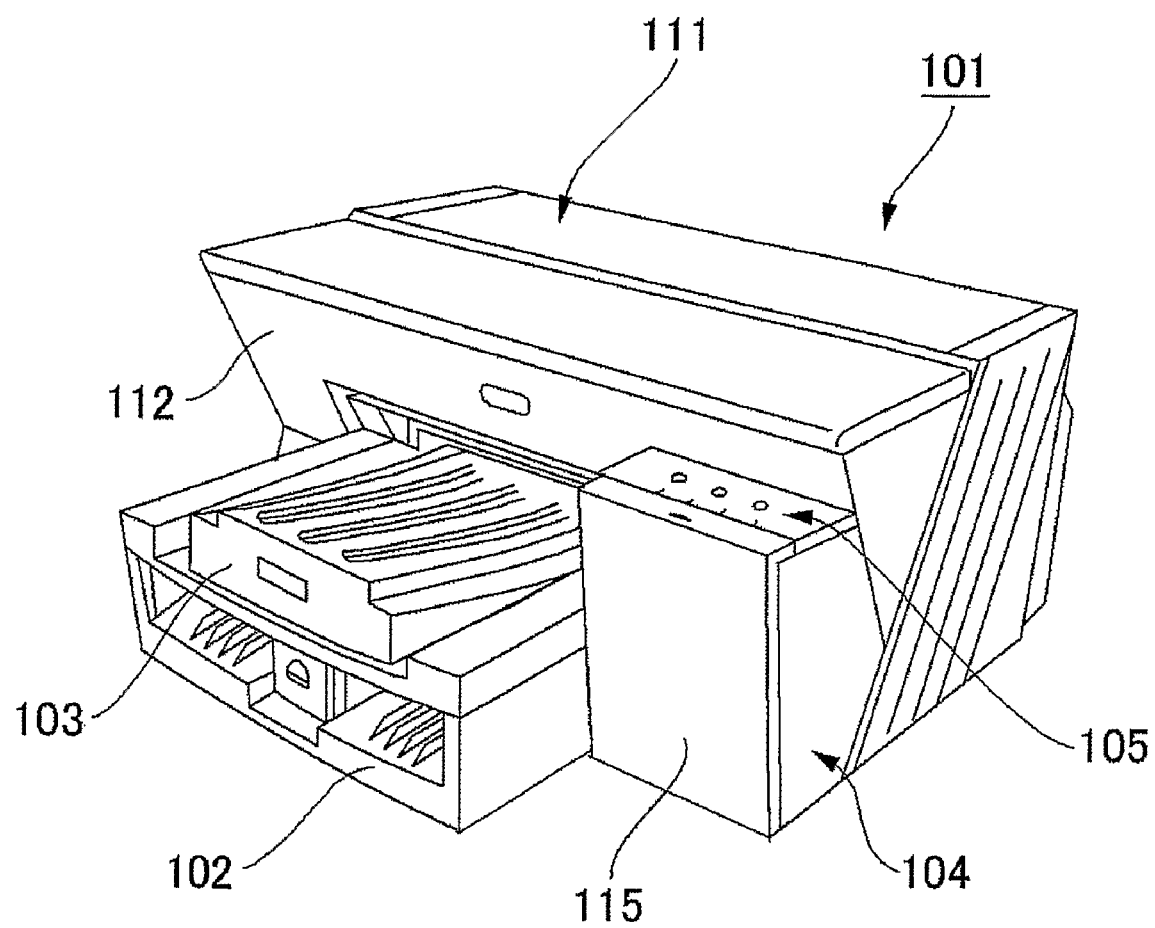
FIG. 1 is a perspective view exemplarily showing an inkjet recording apparatus according to the present invention.

The inkjet recording apparatus of the present invention contains at least an ink ejecting unit, and further contains appropriately selected other units, for example, an impulse generation unit and a control unit in accordance with the necessity.

The inkjet recording method of the present invention includes at least an ink flying step, and further contains appropriately selected other steps, for example, an impulse generation step and a control step in accordance with the necessity.

The inkjet recording method of the present invention can be suitably carried out by the inkjet recording apparatus of the present invention, the ink flying step can be suitably carried out by the ink flying unit, and the aforementioned other steps can be suitably carried out by the aforementioned other units.

—Ink Flying Step and Ink Flying Unit—

The ink flying step is a step in which an impulse is applied to an inkjet recording ink to fly the inkjet recording ink and to thereby form an image.

The ink flying unit is a unit configured to fly an inkjet recording ink by applying an impulse to the inkjet recording ink to thereby form an image. The ink flying unit is not particularly limited and examples thereof include inkjet heads.

The inkjet heads includes a so-called piezoelectric type inkjet head where the volume in an ink flow path is changed to discharge the ink drop by deforming a vibration plate which forms a wall of the ink flow path using a piezoelectric element as a pressure generating means to apply the pressure to the ink in the ink flow path (see JP-A No. 02-51734), a so-called thermal inkjet head where bubbles are generated by heating the ink in the ink flow path using an exothermic resistive element (see JP-A No. 61-59911), and an electrostatic inkjet head where the electrode and the vibration plate which forms the wall of the ink flow path are disposed in opposed positions, and the volume in the ink flow path is changed to jet the ink by an electrostatic power generated between the electrode and the vibration plate (see JP-A No. 06-71882).

The impulse can be generated, for example by the impulse generation unit. The impulse is not particularly limited, and may be appropriately selected in accordance with the intended use. Examples thereof include heat, pressure, vibration, and light. These may be used alone or in combination of two or more. Among them, heat and pressure are suitably preferable.

Examples of the impulse generation unit include a heating device, a pressurizing device, a piezoelectric element, a vibration generating device, an ultrasonic oscillator and a light. Specifically, the examples thereof include a piezoelectric actuator such as a piezoelectric element, a thermal actuator which utilizes phase change by membrane boiling of the liquid using an electric thermal conversion element such as an exothermal resistive element, a shape memory alloy actuator using a metallic phase change by thermal change, and an electrostatic actuator using the electrostatic power.

The aspect of ejection of the recording ink is not particularly limited, is different depending on the impulse, and when the impulse is "heat", the method in which heat energy corresponding to recording signals is imparted using a thermal head to the recording ink in a recording head to generate bubbles in the recording ink by the heat energy and the recording ink is jetted and spouted as the liquid drop from a nozzle pore of the recording head by pressure of the bubbles is included. When the impulse is "pressure", the method in which the piezoelectric element is bended and the volume in a pressure room is reduced to jet and spout the recording ink as droplets from the nozzle pore of the recording head by applying voltage to the piezoelectric element adhered at a position called the pressure room in the ink flow path in the recording head is included.

The size of droplets of the recording ink to fly is preferably set within the range of 3 pL to 40 pL, for example, and the rate of discharging and ejecting of the recording ink is preferably set within the range of 5 m/s to 20 m/s. The drive frequency is preferably set to 1 kHz or more, and the resolution is preferably 300 dpi or more.

The controlling unit is not particularly limited and may be suitably selected in accordance with the intended use as long as operations of the respective units can be controlled. Examples thereof include instruments such as sequencers, and computers.

In the present invention, the nozzle plate surface of an inkjet head in the ink flying unit has an ink repellent layer containing a silicone resin.

The silicone resin is a resin having a siloxane bond consisting of Si and O as a basic skeleton and is commercially available in various configurations such as oils, resins, and elastomers and is provided with various physical properties such as heat resistance, releasing property, anti-foaming property, and cohesiveness, besides ink repellency which is important in the present invention. Silicone resins include silicone resins which are curable at room temperature, heat-curable silicone resins, ultraviolet ray-curable resins, and the like, and the silicone resin can be selected in accordance with the production method and use application.

Examples of a method of forming the ink repellent layer containing the silicone resin on a nozzle surface include a method in which a liquid silicone resin material is vacuum evaporated to thereby form an ink repellent layer on a nozzle surface; a method in which a silicone oil is plasma-polymerized to thereby form an ink repellent layer on a nozzle surface, a method in which an ink repellent layer is formed by a coating method such as spin-coating, dipping, spray coating, and a method of forming an ink repellent layer by electro-coating. When the ink repellent layer is formed by a method other than electro-coating, after masking a nozzle hole and the back surface of a nozzle plate with a photo-resist, a water soluble resin or the like and forming an ink repellent layer, the photo-resist is peeled off and removed from the back surface of the nozzle plate, thereby an ink repellent layer containing a silicone resin can be formed on only the nozzle plate surface. When the photo-resist is peeled off using a strongly alkaline peeling agent, attention is required because the peeling agent damages the ink repellent layer.

The thickness of the ink repellent layer containing a silicone resin is preferably 0.1 μm to 5.0 μm, and more preferably 0.1 μm to 1.0 μm. When the thickness of the ink repellent layer is less than 0.1 μm, the resistance to wiping may degrade and the ink repellency may degrade when the inkjet head is used for a long period of time, and when the thickness is more than 5.0 μm, the production cost may increase because the ink repellent layer is excessively thickened.

The surface roughness (Ra) of the ink repellent layer is preferably 0.2 μm or less. By setting the surface roughness Ra of the ink repellent layer to 0.2 μm or less, unwiped portions in the ink repellent layer can be reduced.

FIGS. 6 and 7A to 7C are respectively a cross sectional view of the nozzle plate of an inkjet head used in the present invention.

In the present embodiment, a nozzle plate 32 serving as a plate base of the inkjet head is prepared with electroformed nickel, and an ink repellent layer 31 is formed on the surface of the nozzle plate 32. The surface roughness of the ink repellent layer 31 is preferably set to 0.2 μm or less.

Figure 7A:
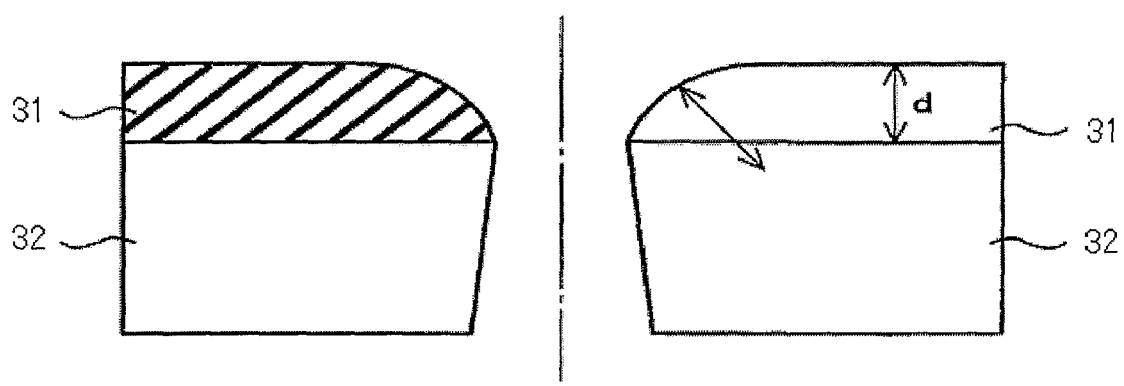
FIG. 7A is a schematic view exemplarily showing a nozzle plate of an inkjet heat according to the present invention.
Figure 7B:
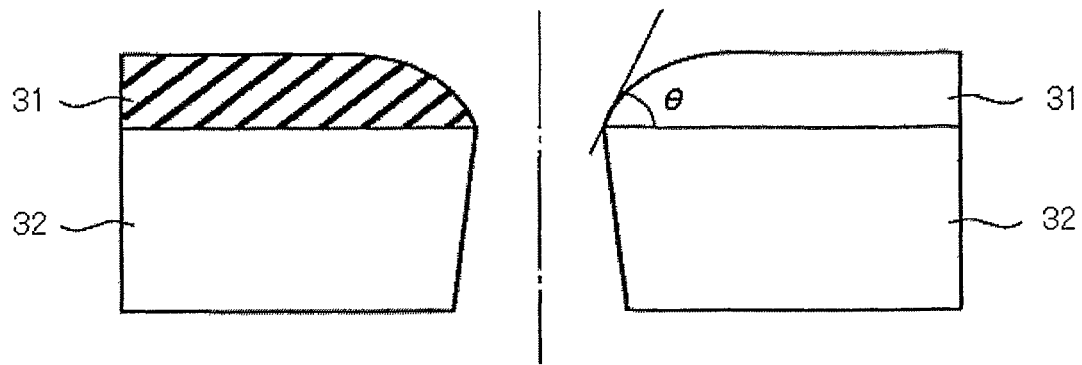
FIG. 7B is another schematic view exemplarily showing a nozzle plate of an inkjet heat according to the present invention.
Figure 7C:
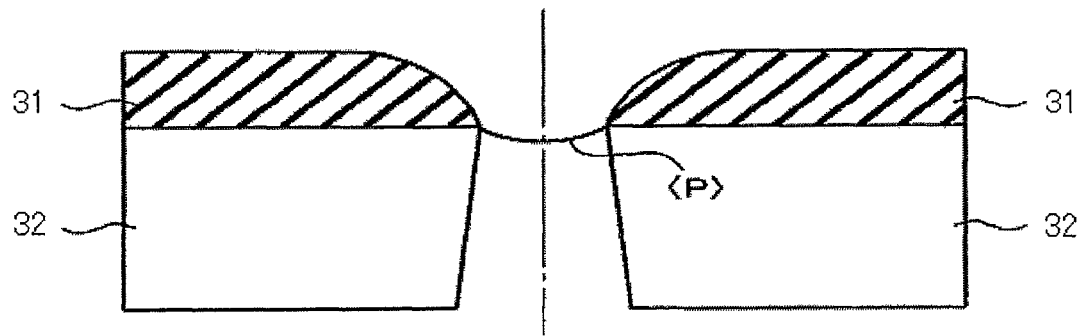
FIG. 7C is a yet another schematic view exemplarily showing a nozzle plate of an inkjet heat according to the present invention.

When feeding an ink 3, as shown in FIG. 7C, a meniscus (fluid level) P is formed at the boundary between the ink repellent layer 31 made of the silicone resin coating layer and the nozzle plate 32.

The ink repellent layer 31 formed on the plate surface where an opening for ink discharge (nozzle) of the inkjet head is provided is formed such that the cross sectional area of the ink repellent layer in a plane surface, near the opening, which is perpendicular to the center line of the opening is gradually increased as more the ink repellent layer is away from the plate base surface.

The shape of the ink repellent layer near the opening is preferably a curved surface. Further, the curvature radius of a curve near the opening of the ink repellent layer in the cross section of the plane surface including the center line of the opening is preferably greater than the thickness of the ink repellent layer.

The curve formed from the outside edge of the opening of the ink repellent layer in the cross section of the plane surface including the center line of the opening to the neighborhood of the opening is a substantially circular arc curve, and the curvature radius of the circular arc is preferably greater than the thickness of the ink repellent layer.

Further, an angle formed between the tangential line passing at the outside edge of the opening of the ink repellent layer in the cross section of the plane surface including the center line of the opening and the nozzle surface including the outside edge is preferably less than 90 degrees.

An opening of the nozzle plate 32 is formed such that the cross section which is represented by a plane surface perpendicular to the center line of a dashed-dotted line as shown in FIGS. 7A to 7C is formed in a substantially a circle centered on the center line. The ink repellent layer 31 formed on the ink discharge surface in the nozzle plate 32 is formed such that the cross sectional area of the opening, which is represented by a plane surface perpendicular to the center line of the opening, is gradually increased as more the ink repellent layer 31 is away from the nozzle plate 32.

More specifically, the opening of the ink repellent layer 31 is, as shown in FIG. 7A, formed such that the curve formed from the outside edge of the opening of the nozzle plate 32 to the neighborhood of the opening is formed in a round shape having a curvature radius 'r'. The curvature radius 'r' is preferably greater than the thickness 'd' of portions of the ink repellent layer 31 other than the neighborhood of the opening of the ink repellent layer 31.

The thickness 'd' is as thick as the portions other than the round part of the opening of the ink repellent layer 31. Preferably, the thickness 'd' may be the maximum thickness of the ink repellent layer.

As shown in the figure, by forming the opening of the ink repellent layer 31 which is articulated to the opening of the nozzle plate 32 in a curved shape having no substantially peaked edge (with a smooth curve having no pointed portions) without having hooked portions, it is possible to prevent troubles that a wiper is caught on such pointed portions to peel off the ink repellent layer 31 from the nozzle plate 32.

As shown in FIG. 7B, an angle θ formed between the tangential line passing at the outside edge of the opening of the ink repellent layer 31 in the cross section of a plane surface including the center line of the opening of the nozzle plate 32 and the surface of the nozzle plate 32 including the outside edge of the opening of the nozzle plate 32 which is articulated to the outside edge of the opening is preferably less than 90 degrees.

By setting the angle θ between the tangential line of the outside edge of the opening of the ink repellent layer 31 and the surface of the nozzle plate 32 less than 90 degrees, as shown in FIG. 7C, a meniscus (fluid level) P can be stably formed at the boundary between the ink repellent layer 32 and the nozzle plate 32, and the possibility that the meniscus P is formed in the other portions can be greatly reduced. As the result, it is possible to achieve excellent ink injection stability when forming an image with the use of an image forming apparatus using an inkjet head including the nozzle plate 32 because the meniscus-formed surface can be stably formed.

For the silicone resin to be used in the present embodiment, a liquid silicone resin which can be hardened at room temperature is preferable, and a liquid silicone resin accompanying a hydrolysis reaction is more preferable. SR2411 manufactured by Toray DOW CORNING TORAY SILICONE CO., LTD. was used in the Examples, which will be hereinafter described.

Table A shows the evaluation results on the shape formed from the outside edge of the opening of the nozzle plate 32 to the neighborhood of the outside edge of the opening, ink deposits around the nozzle, edge peel-off, and ink injection stability in the ink repellent layer 31 at the inkjet head according to the embodiment.

TABLE A

| Edge shape | | Ink deposit | Edge peel-off | Ink injection stability |
| --- | --- | --- | --- | --- |
| Pointed edge existed | | Partly occurred | Occurred | Stable |
| No pointed edge existed (formed in a round shape) | θ ≤ 90° | Not occurred | Not occurred | Stable |
| | θ > 90° | Not occurred | Not occurred | Not stable |
| | r ≥ d | Not occurred | Not occurred | Stable |
| | r < d | Not occurred | Partly occurred | Not stable |

The results shown in Table A demonstrated that an ink repellent layer 31 containing a substantially peaked edge at the edge portion (in the neighborhood of the outside edge of the opening) caused ink deposits around the nozzle, and the edge was peeled off in the course of wiping.

Figure 8A:
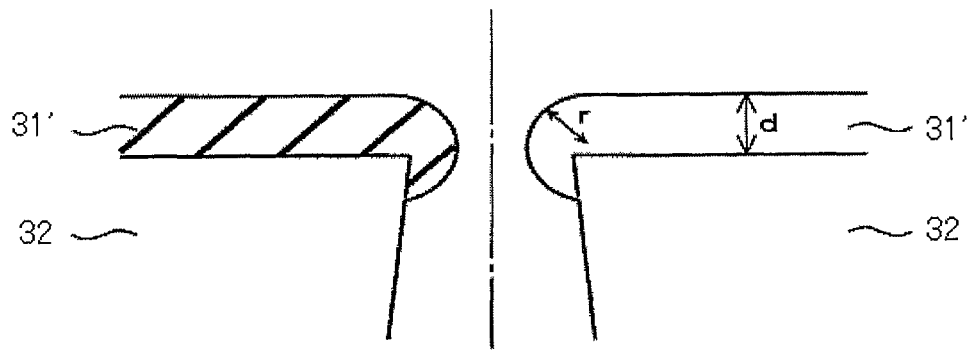
FIG. 8A is a schematic view exemplarily showing a nozzle plate of an inkjet head for comparison.
Figure 8B:
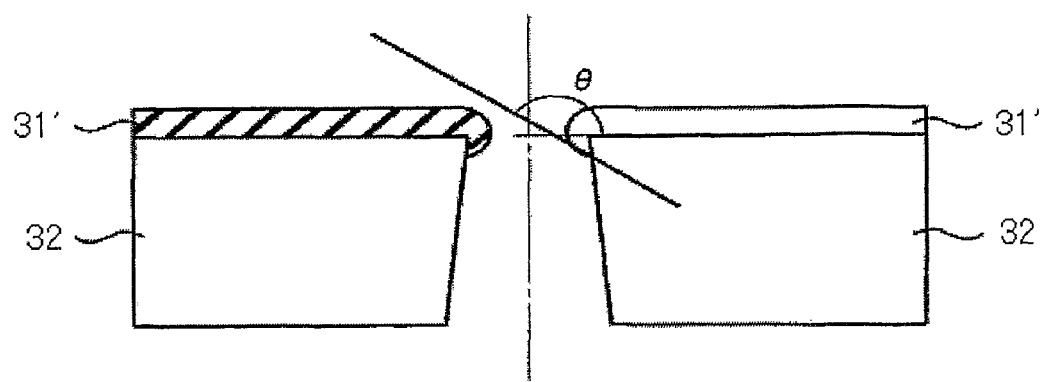
FIG. 8B is another schematic view exemplarily showing a nozzle plate of an inkjet head for comparison.

Any of ink repellent layers 31 each having a round shape at the edge thereof caused no ink deposit, however, by way of comparison, an ink repellent layer having r<d as exemplarily shown in FIG. 8A caused peel-off at part of the edge, and an ink repellent layer having θ>90° as exemplarily shown in FIG. 8B resulted in unstable injection of ink droplets.

Figure 8C:
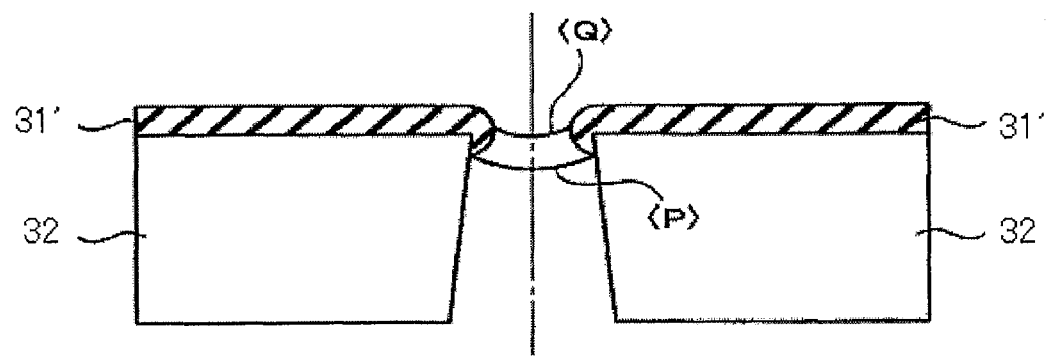
FIG. 8C is a yet another schematic view exemplarily showing a nozzle plate of an inkjet head for comparison.

Further, as shown in FIG. 8C, with the use of an ink repellent layer having r<d or θ>90°, there was a case where a meniscus (fluid level) P was formed at the boundary between the ink repellent layer 31 and the nozzle plate 32 when feeding the ink and there was a case where a meniscus Q was formed at a convex portion toward the center part of the opening of the ink repellent layer 31' (the portion at which the cross sectional area perpendicular to the center line of the opening is the smallest) when feeding the ink. For this reason, there may be cases where there are variations in ink injection stability of an ink when an image is recorded using an inkjet recording apparatus using an inkjet head which includes the nozzle plate 32.

The method of producing a nozzle of the inkjet head according to the present embodiment set forth above will be described hereinafter.

Figure 9:
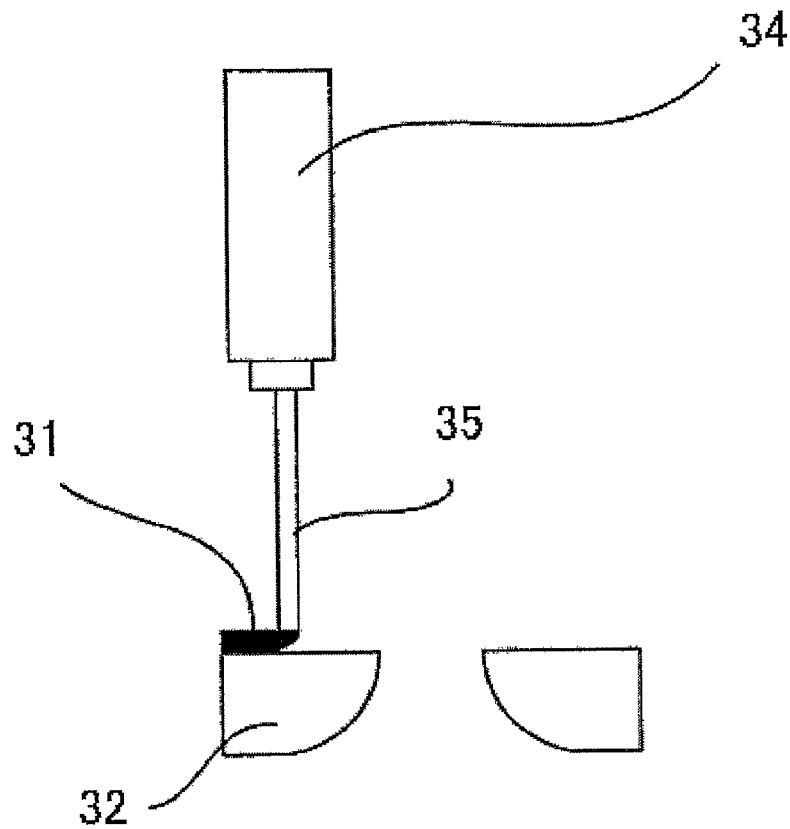
FIG. 9 is a view showing a state where an ink repellent layer is formed by applying a silicone resin using a dispenser.

FIG. 9 is a view showing a construction forming an ink repellent layer 31 by applying a silicone resin using a dispenser 34 according to the embodiment.

On the ink ejecting side of a nickel electroformed nozzle 32, a dispenser 34 to apply a silicone solution is arranged. It was possible to form a silicone resin film selectively on the ink discharge surface of the nozzle plate 32 as shown in FIGS. 6 and 7A to 7C by moving the dispenser 34 while ejecting the silicone from the tip of a needle 35 such that the nozzle plate 32 and the tip of the needle 35 were arranged to keep a predetermined distance.

For the silicone resin used in the embodiment, silicone resin which can be hardened at room temperature SR2411 (manufactured by Toray DOW CORNING TORAY SILICONE CO., LTD.; viscosity: 10 mPa·s) was used. However, a slightly amount of dripping of the silicone was observed in the nozzle hole and the back face of the nozzle plate. The silicone resin film which was selectively formed in this way had a thickness of 1.2 μm and a surface roughness (Ra) of 0.18 μm.

Figure 10A:
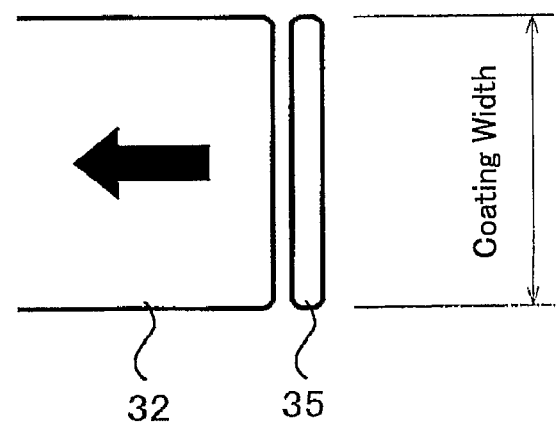
FIG. 10A is a view showing a relation between the application aperture of the tip of a needle and a range required to apply the silicone resin to a nozzle plate which is an application target in the present invention.

The application aperture of the tip of the needle according to the embodiment is ensured with a range by the range required to apply the silicone resin to the nozzle plate 32 which is an application target as shown in FIG. 10A. With this configuration, the silicone resin can be completely applied over the entire surface of the application target by moving the dispenser 34 once in the application direction.

Figure 10B:
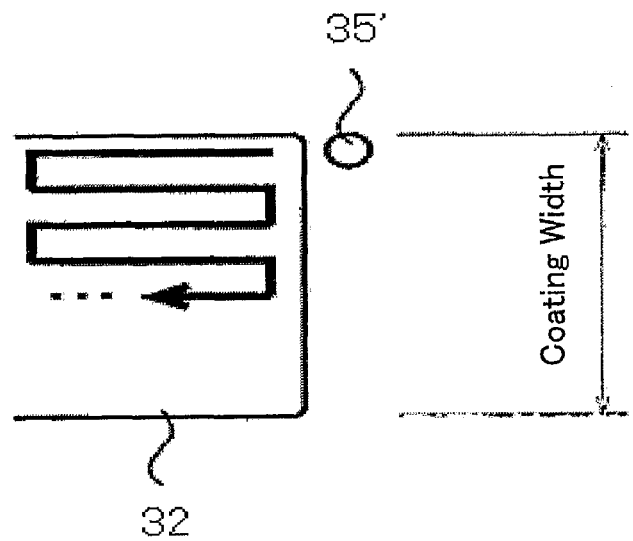
FIG. 10B is a view showing a relation between the tip of a generally used needle and a range required to apply the silicone resin to a nozzle plate which is an application target.

In other words, the configuration allows for only one moving direction of applying motion and cut out the need of altering the direction and moving the dispenser in the opposite direction as shown in FIG. 10B.

Here, the tip of a generally used needle 35 is, as shown in FIG. 10B, significantly narrower than the width for application to the nozzle plate 32 which is the application target, and thus in order to complete the application of a silicone resin to the entire surface of the application target, there is a need to move a dispenser by changing the direction of application by 90 degrees and to move the dispenser in plural directions such as by moving the dispenser in the opposite direction. For this reason, it is difficult to apply a silicone resin to the entire surface of an application target with a uniform thickness.

According to the embodiment, by ensuring the width of the application aperture at the tip of the needle 35 by the width required for application of a silicon resin to the nozzle plate 32 which is the application target, the silicone resin applied over the entire surface of the application target can be applied with a uniform thickness, and the surface finishing can be excellently and precisely achieved.

Figure 11:
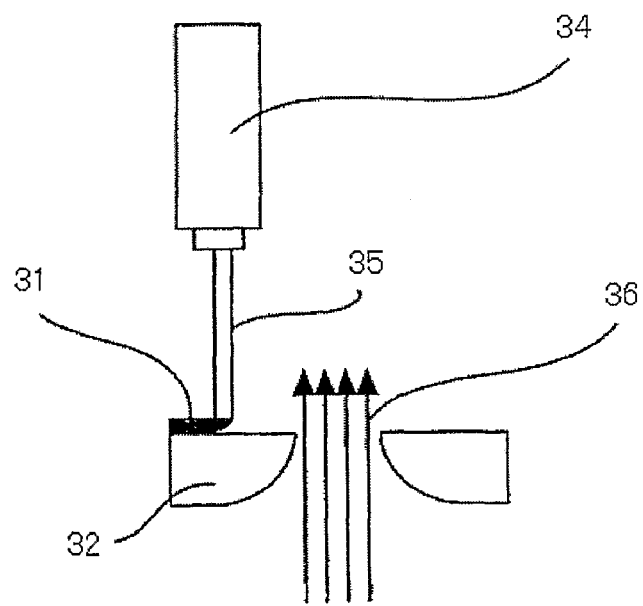
FIG. 11 is a view showing the movement of application of the silicone resin using a dispenser.

FIG. 11 is a view showing the movement of application of the silicone resin using the dispenser 34 according to the present embodiment. The basic construction is similar to the one shown in FIG. 9, however, the silicone is applied while jetting a gas 36 from a nozzle hole (opening) of a nozzle plate 32. For the gas 36, various types of gas can be used as long as it is a gas which hardly initiates chemical reactions with a silicone to be applied. For example, the gas may be air.

By applying the silicone while jetting the gas 36 from the nozzle hole, a silicone resin film can be formed on only the nozzle surface of the nozzle plate 32 except for the nozzle hole.

Figure 12:
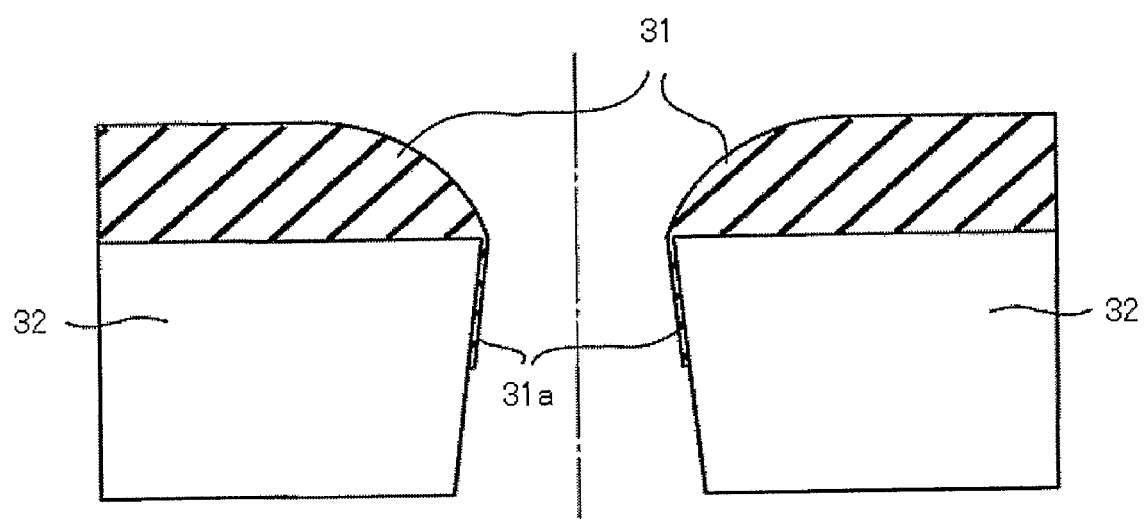
FIG. 12 is a view showing a state where an ink repellant layer made of the silicone resin is formed up to a predetermined depth of the internal wall of the nozzle.

When a similar silicone resin to that stated above is used and applied without jetting the gas 36 to infiltrate the silicone resin up to a predetermined depth and thereafter the gas 36 is jetted from the nozzle 32, an ink repellent layer made of the silicone resin can be formed in the desired depth of the internal wall of the nozzle, for example, to the depth of around several micron meters, as shown in FIG. 12. Namely, an extremely thin ink repellent layer 31a (an ink repellent layer formed at the internal water of the opening of the nozzle plate 32) can be formed up to a predetermined depth from the outside edge of the opening of the nozzle plate 32 as well as the ink repellent layer 31 having the ink discharge surface set forth above.

The thus prepared ink repellent layer 31 of the nozzle plate was wiped with an EPDM rubber (rubber hardness: 50 degrees). As the result, the ink repellent layer 31 of the nozzle plate could keep excellent ink repellency against 1,000 times wiping treatment. The nozzle member with the ink repellent layer 31 formed therein was immersed in the ink which was heated at 70° C. for 14 days. As the result, the ink repellent layer 31 could keep the unchanged ink repellency from the initial stage of the lifetime thereof.

For material of the ink repellent layer, various materials can be used as long as the material sheds water. Specific examples thereof include fluorine-based water repellent materials, and silicone water repellent materials.

For the silicone-based water repellent materials, there are liquid silicone resins or elastomers each of which can be hardened at room temperature. It is preferable that an ink repellent film is formed by applying the liquid silicone resin or elastomer over a surface of a substrate and leaving the substrate with the silicone water repellent material applied to the surface thereof in the atmosphere at room temperature to thereby polymerize and harden the substrate surface.

The above noted silicone-based water repellent material may be a liquid silicone or an elastomer each of which can be hardened at room temperature, and an ink repellent film may be formed by applying the liquid silicone or elastomer over a surface of a substrate and heating the substrate surface to harden the substrate surface.

The silicone water repellent material may be a liquid silicone resin or elastomer each of which can be cured by ultraviolet ray, and an ink repellent film may be formed by applying the liquid silicone resin or elastomer over a surface of a substrate and irradiating the substrate surface with ultraviolet ray to harden the substrate surface.

The viscosity of the silicone water repellent material is preferably 1,000 cp (centipoises) or less.

The critical surface tension of the ink repellent layer is preferably 5 mN/m to 40 mN/m, and more preferably 5 mN/m to 30 mN/m. When the critical surface tension is more than 30 mN/m, the nozzle excessively gets wet with the ink in long-term use, when printed repeatedly, the ejecting direction of the ink may be deflected, and it may cause abnormality in ink particles. When the critical surface tension is more than 40 mN/m, the nozzle plate excessively gets wet with the ink in the initial stage of the use, and thus the ejecting direction of the ink may be deflected, and it may cause abnormality in ink particles.

Actually, ink repellent materials shown in Table B was respectively applied over a surface of an aluminum substrate, and the substrate surface was heated and dried to thereby prepare respective nozzle plates with an ink repellent layer formed therein. The critical surface tension of the respective ink repellent layers was measured. Table B also shows the measurement results.

Here, the critical surface tension can be determined by the Zisman method. Specifically, a liquid whose surface tension is known is dropped on the ink repellent layer surface, and the contact angle θ is measured. The surface tension of the liquid is plotted along 'x' axis and the "cos θ" is plotted along 'y' axis, and then a straight line on the downside can be obtained (Zisman Plot). The surface tension when the straight line is positioned at Y=1 (θ=0) can be calculated as the critical surface tension γc. For other methods to determine the critical surface tension, it can be determined by using Forwkes method, Owens and Wendt method, or Van Oss method.

An inkjet head was prepared using a nozzle plate with an ink repellent layer formed therein in the same manner as the method for producing an inkjet head set forth above. The following cyan ink (cyan ink of Production Example 1 to be explained below) was used in the inkjet head to eject the ink. The process of ink flying was recorded using a video set, and the video recording status was observed. It was verified that the ink normally was in particles and the discharge stability was excellent with the use of any of the prepared nozzle plates, respectively. Table B also shows the results.

<Cyan Ink>

In a vessel, 20.0% by mass of a polymer fine particle dispersions containing a copper phthalocyanine pigment, 23.0% by mass of 3-methyl-1,3-butandiol, 8.0% by mass of glycerine, 2.0% by mass of 2-ethyl-1,3-hexanediol, 2.5% by mass of FS-300 (manufactured by DuPont Co.) as a fluorochemical surfactant, 0.2% by mass of PROXEL LV (manufactured by AVECIA Ltd.) as an antiseptic and anti-fungal agent, 0.5% by mass of 2-amino-2-ethyl-1,3-propanediol, and an appropriate amount of ion exchange water were added to total 100% by mass. Then, the composition was filtered through a membrane filter having an average hole diameter of 0.8 μm, thereby preparing a cyan ink.

TABLE B

| | Trade name | Critical surface tension | Discharge stability |
|---|---|---|---|
| Dow Corning Toray Silicone Co., Ltd. | SR2411 | 21.6 mN/m | Excellent |
| Shin-Etsu Chemical Co., Ltd. | KBM7803 | 16.9 mN/m | Excellent |
| Shin-Etsu Chemical Co., Ltd. | KP801M | 6.6 mN/m | Excellent |

Next, an embodiment of the inkjet recording method of the present invention using the inkjet recording apparatus will be described hereinafter with reference to the drawings. An inkjet recording apparatus shown in FIG. 1 is equipped with an apparatus body 101, a feeder tray 102 attached to the apparatus body 101 for feeding papers, paper output tray 103 attached to the apparatus body 101 for receiving papers on which images are recorded (formed), and an ink cartridge mounting part 104. An operation part 105 having operation keys and indicators is provided on the top surface of the ink cartridge mounting part 104. The ink cartridge mounting part 104 has a front cover 115 that can be opened and/or closed to remove and/or place ink cartridges 201.

Figure 2:
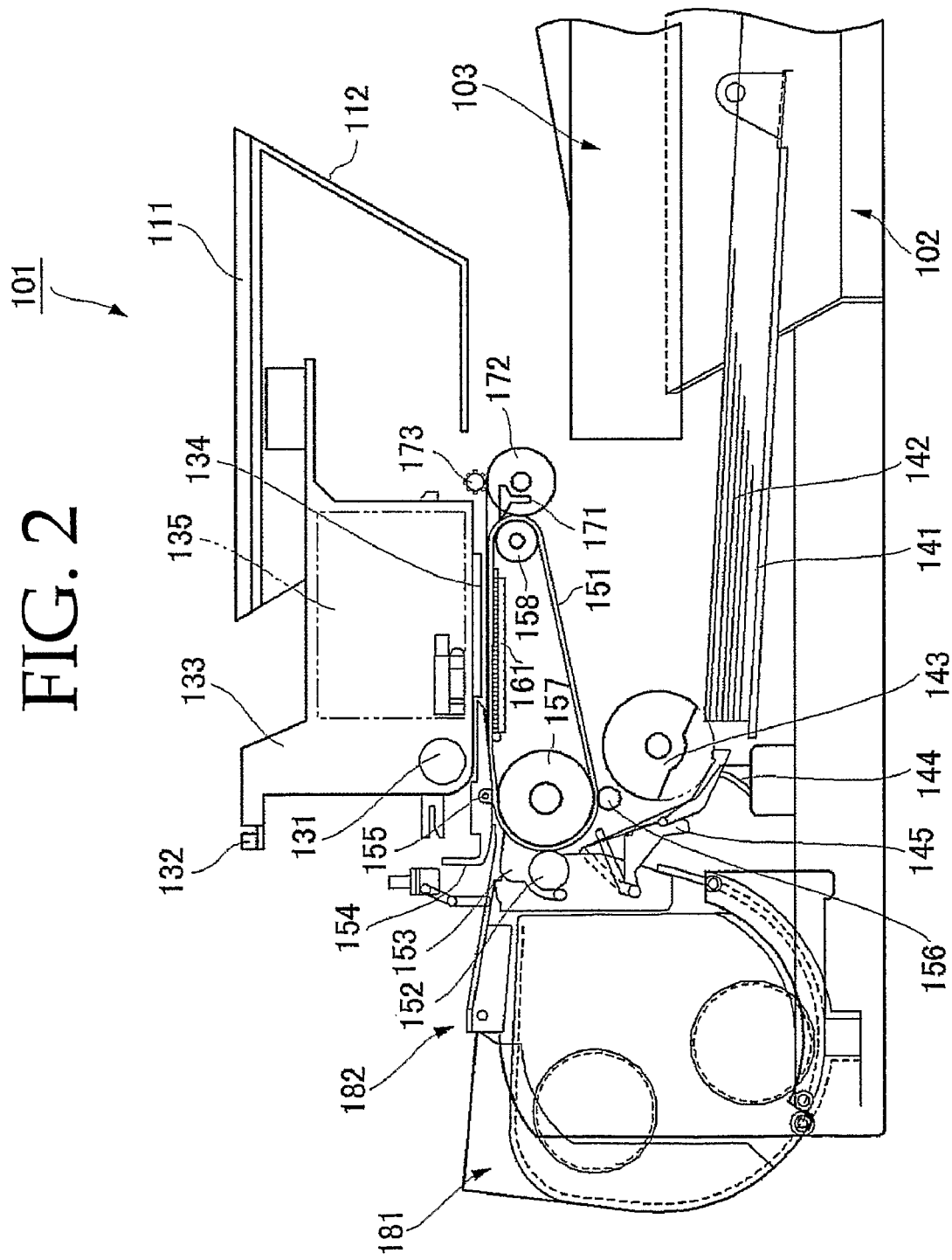
FIG. 2 is a schematic block diagram exemplarily showing the entire structure of an inkjet recording apparatus according to the present invention.
Figure 3:
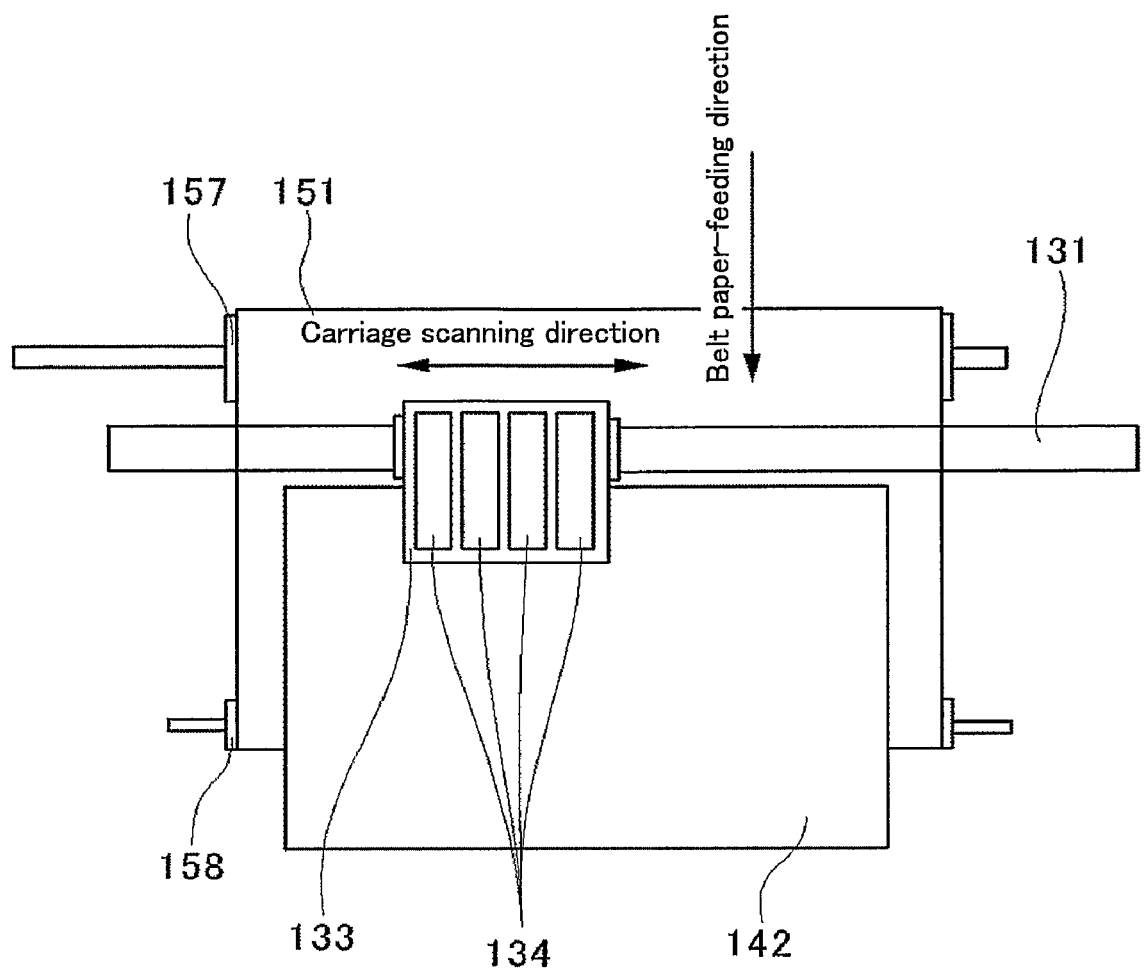
FIG. 3 is a schematic enlarged view showing one example of an inkjet head according to the present invention.

In the apparatus body 101, as shown in FIGS. 2 and 3, a carriage 133 is supported slidably in the scan direction by a guide rod 131 that is a guide member laid across right and left side plates which are omitted in the figures and a stay 132 and moved by a main scan-motor (not shown) in the arrowed directions in FIG. 3 for scanning within the apparatus body 101.

Recording heads 134 consisting of four inkjet recording heads that discharge yellow (Y), cyan (C), magenta (M), and black (B) recording ink droplets, respectively, have ink discharge ports arranged in the intersecting direction with the main scanning direction and they are placed with their ink discharge direction downward.

Inkjet recording heads constituting the recording heads 134 are provided with an energy generation unit for discharging recording ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each ink to the recording heads 134. The subtanks 135 are filled with the recording ink of the present invention from the ink cartridge 200 mounted in the ink cartridge mounting part 104 via a not-shown recording ink supply tube.

In the meanwhile, a paper feed part for feeding paper 142 stuck on a paper load part (platen) 141 of the feed tray 102 is provided with a half-moon roller (a feed roller 143) that separates and supplies the paper 142 from the paper load part 141 one by one and a separation pad 144 that faces the feed roller 143 and is made of a large friction coefficient material. The separation pad 144 is biased toward the feed roller 143.

The apparatus body 101 is also equipped with a conveying part for conveying the paper 142 supplied from the feed part underneath the recording heads 134 is provided with a conveying belt 151 for electrostatically adsorbing and conveying the paper 142, a counter roller 152 for conveying the paper 142 sent from the paper feed part via a guide 145 by clamping it together with the conveying belts 151, a conveying guide 153 for turning the paper 142 sent nearly vertically by 90° so as to lay it on the conveying belt 151, and a leading end pressure roller 155 that is biased toward the conveying belt 151 by a presser member 154. A charging roller 156 that is a charging unit for charging the surface of the conveying belt 151 is also provided.

The conveying belt 151 is an endless belt, being spanned over conveying roller 157 and a tension roller 158 and running around in the belt conveying direction. For example, the conveying belt 151 has a front layer that is a paper adsorbing surface made of a dragging-uncontrolled resin, for example a copolymer of tertafluoroethylene and ethylene (ETFE), having a thickness of around 40 μm and a back layer (an intermediate dragging layer or an earth layer) made of the same material as the front layer, but dragging-controlled with carbon. A guide member 161 is provided behind the conveying belt 151 at the corresponding position to the printing area by the recording heads 134. An output part for discharging the paper 142 on which recording was done by the recording heads 134 is provided with a separation click 171 for separating the paper 142 from the conveying belt 151, a paper output roller 172, and an paper output roller 173. Paper output tray 103 is disposed below paper output roller 172.

A double-side feed unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. A manual feeder 182 is provided on the top surface of the double-side feed unit 181.

In the inkjet recording apparatus having the configuration stated above, the papers 142 supplied from the paper feed part are separated one by one, the paper 142 sent vertically is then guided via guide 145 and conveyed by clamping it together with the conveying belt 151, a conveying guide 153 turns the paper 142 sent nearly vertically by 90° so as to lay it on the conveying belt 151, and a leading end pressure roller 155 that is biased toward the conveying belt 151 by a presser member 154. At that time, the conveying belt 151 has been charged by a charge roller 156, and the conveying belt electrostatically adsorb the paper 142 to convey the paper 142. Ink droplets are discharged on the paper 142 that is at a stop by driving the recording heads 134 according to the image signals while moving a cartridge 133 to record the image by one-line. After the paper 142 is conveyed by a predetermined length, the image is recorded by the subsequent line. By receiving a recording end signal or a signal indicating that the rear end of the paper 142 has reached the recording area, the recording operation is terminated and the paper 142 is discharged to the paper output tray 103.

When it is detected that the remaining amount of the recording ink in the subtank 135 is nearly to the end, a certain amount of recording ink is supplied to the subtank 135 from the ink cartridge 200.

An inkjet recording apparatus according to the present invention is not limited to the embodiment stated above and can be further applied to facsimiles, copiers, and composite devices of printer/facsimile/copier, besides inkjet printers.

Next, an inkjet head according to the present invention will be hereinafter described.

An inkjet head to which the present invention is applied will be described hereinafter.

Figure 4:
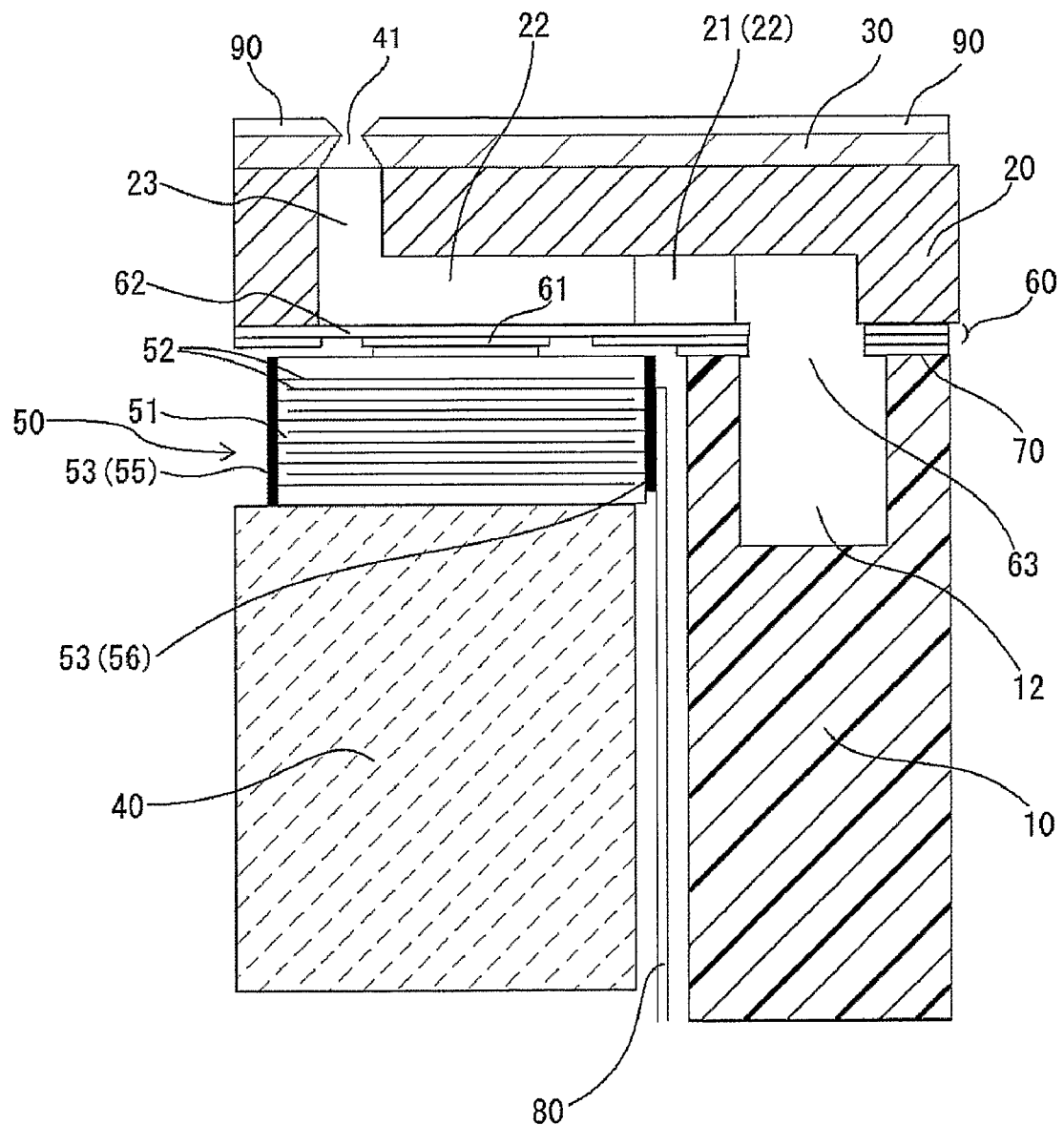
FIG. 4 is an enlarged view exemplarily showing the core part of an inkjet head according to an embodiment of the present invention.
Figure 5:
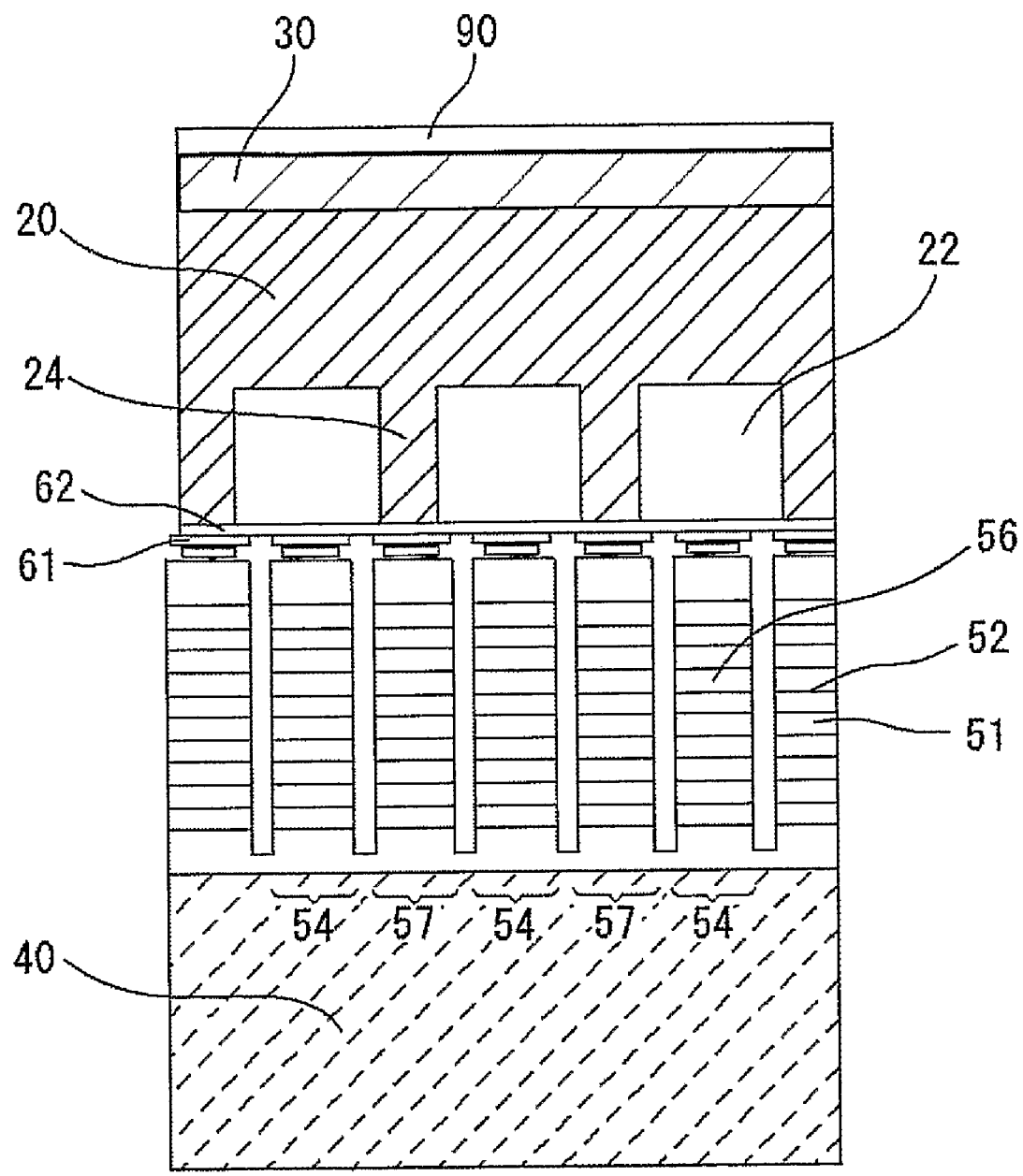
FIG. 5 is an enlarged cross sectional view of the core part of the same head in the inter-channel direction.
Figure 6:
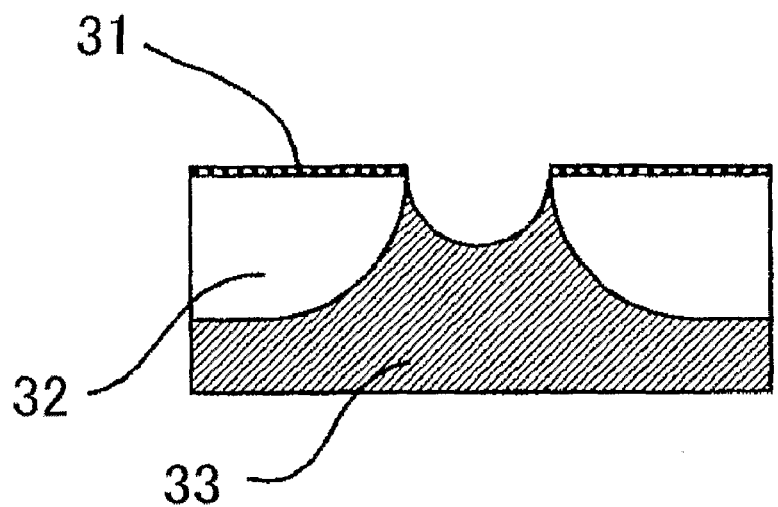
FIG. 6 is a schematic cross sectional view showing a nozzle plate of an inkjet head according to the present invention.

FIG. 4 is an enlarged view exemplarily showing the core part of an inkjet head according to an embodiment of the present invention. FIG. 5 is an enlarged cross-sectional view of the core part of the same head in the inter-channel direction.

This inkjet head is provided with a frame 10 having cutouts serving as an ink supply port (not shown) which supplies an ink from the front side of the figure toward the inner side direction thereof (or toward the paper back face direction) and a common liquid chamber 12 formed thereon; a passage plate 20 having cutouts serving as a fluid dragging part 21 and a pressurized liquid chamber 22 and a communication port 23 that communicates to a nozzle 31 formed thereon; a nozzle plate constituting the nozzle 31; a diaphragm 60 having a raised part 61, a diaphragm part 62 and an ink inflow port 63; a laminated piezoelectric element 50 connected to the diaphragm 60 via an adhesive layer 70; and a base 40 on which the laminated piezoelectric element 50 is fixed. The base 40 is made of barium titanate ceramics, on which two rows of laminated piezoelectric element 50 are arranged and connected.

The piezoelectric element 50 consists of alternately laminated piezoelectric layers 51 of lead zirconate titanate (PZT) having a thickness of 10 μm to 50 μm per layer and internal electrode layers 52 of silver palladium (AgPd) having a thickness of several μm per layer. The internal electrode layers 52 are connected to external electrodes 53 at both ends.

The alternately laminated piezoelectric element 50 is divided into a comb-like shape by half-cut dicing, having driving parts 56 and supporting parts (non-driving part) 57 every other division (FIG. 5). The outer end of one of the two external electrodes 53 is processed, for example, is notched, for limiting on length, thereby being divided by half-cut dicing. The outer end is connected to one end of the internal electrodes 52 at a position in the front side direction of the figure or the inner side direction. Then, the division of the external electrode 53 makes multiple separate electrodes 54. The other is not divided by dicing, and is conductive and serves as a common electrode 55.

A FPC (reference numeral 80) is soldered to the individual electrodes 54 of the driving part. The common electrode 55 is turned in an electrode layer provided at the end of the laminated piezoelectric element and connected to the Gnd electrode of the FPC 80. An not-shown driver IC is mounted on the FPC 80 to control the application of driving voltage to the driving part 56.

As for the diaphragm 60, a thin film diaphragm part 62, an island-shaped raised part (island part) 61 formed at the center of the diaphragm part 62 and connected to the laminated piezoelectric element 50 serving as the driving parts 56, a thick part including beams to be connected to the supporting part, and an opening serving as in ink inflow port 63 are formed by electroforming two nickel plated films in piles. The diaphragm part has a thickness of 3 μm and a width (one side) of 35 μm.

The connections between the island-shaped raised part 61 of the diaphragm 60 and the movable parts 56 of the laminated piezoelectric element 50 and between the diaphragm 60 and the frame 10 are made by patterning the adhesive layer 70 including a gap material.

The passage plate 20 is made of a silicon mono-crystalline substrate, in which cutouts serving as a liquid dragging part 21 and a pressurized liquid chamber 22 and a through-hole 23 provided at the corresponding position to the nozzle 31 and serving as a communication port 23 are patterned by etching.

The remaining part after the etching serves as a partition wall 24 of the pressurized liquid chamber 22. In this head, a part etched in a smaller width is provided, which serves as the liquid dragging part 21.

The nozzle plate 30 is made of a metal material such as a nickel plated film formed by electroforming and has a number of nozzles 31 serving as fine discharge openings for discharging ink droplets. The nozzle 31 has a horn-like (nearly cylindrical or nearly truncated cone) internal shape (inner shape). The nozzle 31 has a diameter of approximately 20 μm to 35 μm at the ink droplets discharge side. The nozzle pitch in each row is 150 dpi.

The ink discharging surface (nozzle front side) of the nozzle plate 30 is provided with an ink-repellent layer 90 serving as a water-repellent finish film. In the present invention, in order to keep sufficient ink repellency to an ink containing a fluorochemical surfactant, the ink repellent layer 90 is composed of a composition containing a silicone resin. The composition containing a silicone resin is composed of a mixture of components of a single silicone resin or another resin and metal and the like. For example, a composition in which silicone resin fine particles are dispersed in a fluorine resin, a kneaded product between a silicone resin and polypropylene, and product obtained by eutectoid plating between a silicone resin and Ni. To prevent elution of a silicone resin, a mixture of a silicone resin and other components other than silicone resins are more effectively used.

In an inkjet head having the above-mentioned structure, a driving waveform (10V to 50V pulse voltage) is applied to the driving part 56 according to recording signals. The driving part 56 is shifted in the lamination direction. The pressurized liquid chamber 22 is pressurized via the nozzle plate 30 and the pressure is increased, thereby ink droplets are discharged through the nozzle 31.

After the ink droplets discharge is completed, the ink pressure in the pressurized liquid chamber 22 is reduced. The inertia ink flow and driving pulse discharge process causes negative pressure within the pressurized liquid chamber 22, leading to the ink supply process. Meanwhile, the ink supplied from the ink tank enters the common liquid chamber 12 and further fills the pressurized liquid chamber 22 from the common liquid chamber 12 via the ink inflow port 63 and fluid dragging part 21.

The fluid dragging part 21 effectively attenuates residual pressure fluctuation while it stands against recharging (refilling) due to surface tension. Appropriately selected dragging part balances residual pressure attenuation with refilling time and shortens the transition time to the next ink droplets discharge operation (driving cycle).

<Inkjet Recording Ink>

The inkjet recording ink contains at least a pigment, water, a fluorochemical surfactant, and a nonionic surfactant, and further contains other components in accordance with the necessity.

—Nonionic Surfactant—

The nonionic surfactant used in the present invention will be described below. It should be noted that "nonionic surfactant" excludes nonionic fluorochemical surfactants which will be described hereinafter.

The nonionic surfactant can effectively serve as a dispersing agent of a pigment. It is characteristic that a pigment used in the present invention is preferably dispersed in a nonionic surfactant. The nonionic surfactant used as the dispersing agent is not particularly limited and may be suitably selected in accordance with the intended use, however, by using a compound represented by the following Formula (1) as the dispersing agent, it is possible to obtain a water-based pigment dispersion and a water-based pigment ink both having a smaller average particle diameter and having a narrower range of standard deviation in the particle size distribution.

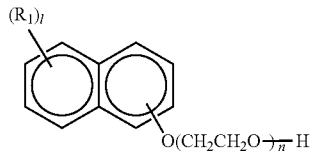

Formula (1)

In Formula (1), $R_1$ represents an alkyl group, an allyl group, or an aralkyl group each having 1 to 20 carbon atoms, "l" is an integer of 0 to 7, and "n" is an integer of 20 to 200.

In the above-noted $R_1$, examples of an alkyl group having 1 to 20 carbon atoms include methyl, ethyl, n-propyl, i-propyl, butyl (n-butyl, i-butyl, t-butyl, sec-butyl); pentyl (n-pentyl, i-pentyl, neopentyl, cyclopentyl, etc.); hexyl (n-hexyl, i-hexyl, cyclohexyl, etc.); heptyl (n-heptyl, i-heptyl, etc.); octyl (n-octyl, i-octyl, t-octyl, etc.); nonyl (n-nonyl, i-nonyl, etc.); decyl (n-decyl, i-decyl, etc.); undecyl (n-undecyl, i-undecyl, etc.); dodecyl (n-dodecyl, i-dodecyl, etc.); or cyclopropyl, cyclobutyl, cyclopentyl, cyclohexyl, cycloheptyl, and cyclooctyl.

Examples of an aralkyl group having 1 to 20 carbon atoms include benzyl, phenethyl, 2-methylbenzyl, 3-methylbenzyl, and 4-methylbenzyl.

In Formula (1), "n" is preferably an integer of 20 to 200, more preferably an integer of 20 to 100, and still more preferably 30 to 50. When "n" is an integer of less than 20, the dispersion stability of the nonionic surfactant tends to degrade, it may be an ink containing a pigment which has a large average particle diameter and a wide range of standard deviation in the particle size distribution, and thus satisfactory color saturation cannot be obtained. In contrast, when "n" is an integer more than 200, it tends to be difficult to carry out printing based on inkjet technology.

The hydrophilic group of the nonionic surfactant is preferably a polyoxyethylene group. The reason is not clearly known, however, the hydrophilic group is preferably a polyoxyethylene group in that it can properly keep charge held on pigment particle surfaces and can reduce foamability of the ink.

Examples of the nonionic surfactant include polyoxyethylene (n=7) octyl ether, polyoxyethylene (n=20) β-naphthyl ether, polyoxyethylene (n=40) β-naphthyl ether, and polyoxyethylene (n=60) β-naphthyl ether. Of these, polyoxyethylene (n=40) β-naphthyl ether is particularly preferable.

For the addition rate of the nonionic surfactant relative to the pigment in the inkjet recording ink, based on mass, the nonionic surfactant is preferably added in an amount of 0.1 to 2.0 relative to 1 of pigment, and more preferably 0.1 to 1.0. By setting the addition rate of the nonionic surfactant within the range of 0.1 to 2.0, an ink having a smaller average particle diameter and a narrower range of standard deviation in the particle size distribution can be provided. When the addition rate of the nonionic surfactant relative to the pigment is less than 0.1, an ink liquid is obtained which has a largere average particle diameter and a wide range of standard deviation in the particle size distribution, and thus there are a large amount of coarse particles of pigment in the ink adhered on a nozzle plate, and the ink repellent layer may be damaged caused by friction of the coarse particles in the ink during wiping. When the addition rate of the nonionic surfactant is more than 2.0, it tends to be difficult to carry out printing based on inkjet technology because of the excessively high viscosity of the ink.

—Fluorochemical Surfactant—

By containing the fluorochemical surfactant in the ink, the wetting property of the ink to paper can be improved without impairing the stability of pigment fine particles obtained using the nonionic dispersing agent. With the improvement in the wetting property of the ink to paper, a highly color-developed image with less ink bleed can be obtained.

The fluorochemical surfactant is not particularly limited and may be suitably selected in accordance with the intended use. Examples thereof include perfluoroalkyl sulfonate, perfluoroalkyl carboxylate, perfluoroalkyl phosphate, perfluoroalkyl ethylene oxide adducts, perfluoroalkyl betaine, and perfluoroalkyl amine oxide compounds. Of these, compounds represented by the following Formulas (2) or (3) are particularly preferable from the perspective of reliability.

Formula (2)

In Formula (2), "m" is an integer of 0 to 10, and "n" is an integer of 0 to 40.

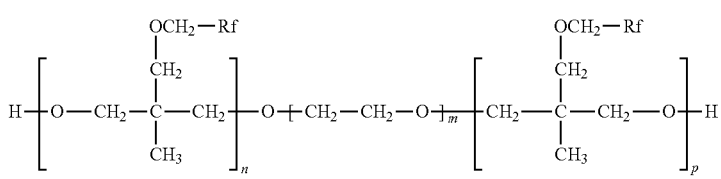

Formula (3)

In Formula (3), Rf represents a fluorine containing group, examples thereof include $CF_3$, $CF_2$, and $CF_3$; "m", "n", and "p" are respectively an integer; "m" is an integer of 6 to 25; "n" is an integer of 1 to 4; and "p" is an integer of 1 to 4.

For the fluorochemical surfactant, a commercially available product can be used. Examples of the commercially available product include S-144 and S-145 (manufactured by Asahi Glass Co.); FC-170C, FC-430, and FRORARD FC4430 (manufactured by Sumitomo 3M Ltd.); FSO, FSO-100, FSN, FSN-100, and FS-300 (manufactured by DuPont Co.); and FT-250 and FT-251 (manufactured by Neos Co.). Of these, FSO, FSO-100, FSN, FSN-100, and FS-30 manufactured by DuPont Co. are preferable in that they allow providing excellent printing quality and storage stability. Each of these surfactants that are nonionic fluorochemical surfactants may be used alone or in combination with two or more.

The added amount of the fluorochemical surfactant in the ink is preferably 0.1% by mass to 10% by mass, and more preferably 0.1% by mass to 5% by mass. When the added amount of the fluorochemical surfactant is less than 0.1% by mass, a remarkable effect of enhancement in permeability cannot be obtained. When the added amount is more than 10% by mass, the viscosity of the ink is increased when the ink is stored under a high-temperature condition to cause flocculation of the ink, and the reliability of the ink may degrade.

—Resin Emulsion—

When the ink is dropped on a recording medium such as paper, the resin emulsion has properties of being thickened and flocculated and an effect that prevents infiltration of colored components to accelerate further fixing of the ink on paper. Depending on the type of the resin emulsion, it has an effect of forming a film on paper to also enhance abrasion resistance of a printed record. Further, by adding a resin emulsion in materials of the ink, the dispersion stability of the pigment can be enhanced. However, due to increases in ink adhesion to the silicone layer, and the like, the durability of the silicone layer may degrade.

Examples of the resin emulsion include styrene-acrylic resins, acrylic silicone resins, and polyurethane resins. Of these, polyurethane resins are particularly preferable.

When the emulsion resin is used as a raw material for producing a pigment ink, or after preparing an ink composition in the present invention, the emulsion resin should exist as an O/W emulsion. Polyurethane resin emulsions are divided into two types i.e. the one that is emulsified by using an emulsifier with a commonly used polyurethane resin that is relatively hydrophilic, as an external additive, and a self-emulsifiable emulsion in which a functional group capable of serving as an emulsifier is introduced to a resin itself by means of copolymerization. Both types of polyurethane resin emulsions can be used, however, attention is required because depending on the combination of a pigment ink composition components, there is a slight difference in dispersion stability between a pigment and emulsion particles. Among various combinations of a pigment and a dispersing agent, the one that is constantly excellent in dispersion stability is a self-emulsifiable anionic polyurethane emulsion resin. When such an emulsion resin is used, the polyurethane resin is more preferably an ether-based polyurethane resin than polyester-based or polycarbonate-based polyurethane resin in terms of sticking tendency and dispersion stability of pigment. The reason is not clearly known, however, many non-ether type polyurethane resins are weak in resistance to solvents and are likely to flocculate when stored under high-temperature conditions.

For the resin emulsion, a commercially available product can be used. Examples of the commercially available resin emulsion include J-450, J-734, J-7600, J-352, J-390, J-7100, J-741, J74J, J-511, J-840, J-775, HRC-1645, and HPD-71 (styrene-acrylic resin emulsions, manufactured by Johnson Polymer Inc.); UVA383MA (acryl-silicone resin emulsion, manufactured by BASF Corporation); AP4710 (acryl-silicone resin emulsion, manufactured by SHOWA HIGHPOLYMER CO., LTD.); and SF460, SF460S, SF420, SF110, SF300, and SF361 (polyurethane resin emulsions, manufactured by Nippon Unicar Co., Ltd.).

The content of the resin emulsion in the inkjet recording ink, as resin solid content, is preferably 0.1% by mass to 20% by mass, and more preferably 0.2% by mass to 10% by mass. When the content of the resin emulsion is less than 0.1% by mass, after the resin emulsion is dropped on a recording medium, effect of abrasion resistance is small due to the insufficient amount of the resin that covers the pigment. When the content of the resin emulsion is more than 20% by mass, it tends to be difficult to carry out printing based on inkjet technology due to the excessively high viscosity of the ink.

—Pigment—

The pigment is not particularly limited and may be suitably selected in accordance with the intended use, however, organic pigments or inorganic pigments may be preferably used. Two or more pigments may be selected from these pigments and mixed for use.

Examples of the organic pigments include azo pigments, phthalocyanine pigments, anthraquinone pigments, quinacridone pigments, dioxazine pigments, indigo pigments, thioindigo pigments, perylene pigments, isoindolinon pigments, aniline black, azomethine pigments, Rhodamine B Lake pigments, and carbon black.

Examples of the inorganic pigment include iron oxides, titanium oxides, calcium carbonate, barium sulfate, aluminum hydroxide, barium yellow, iron blue, cadmium red, chrome yellow, and metal powder.

For a carbon black used in a black pigment ink in the present invention, a carbon black produced by furnace method or channel method is preferably used, and a carbon black is preferably used which has a primary particle diameter of 15 nm to 40 nm, a specific surface area determined by BET method of 50 $m^2/g$ to 300 $m^2/g$, a DBP oil absorption of 40 mL/100 g to 150 mL/100 g, and a volatile content of 0.5% to 10%, and a pH value of 2 to 9.

For the carbon black, a commercially available product can be used. Examples of the commercially available carbon black include No. 2300, No. 900, MCF-88, No. 33, No. 40, No. 45, No. 52, MA7, MA8, MA100, and No. 2200B (all manufactured by Mitsubishi Chemical Corporation); RAVEN 700, RAVEN 5750, RAVEN 5250, RAVEN 5000, RAVEN 3500, and RAVEN 1255 (all manufactured by Columbia Co.); Regal 1400R, Regal 330R, Regal 660R, MOGUL L, MONARCH 700, MONARCH 800, MONARCH 880, MONARCH 900, MONARCH 1000, MONARCH 1100, MONARCH 1300, and MONARCH 1400 (all manufactured by CABOT Corp.); COLOR BLACK FW1, COLOR BLACK FW2, COLOR BLACK FW2V, COLOR BLACK FW18, COLOR BLACK FW200, COLOR BLACK S 150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (all manufactured by Degsa Co.).

Next, specific examples of color pigments are exemplarily described below.

As organic pigments, azo pigments, phthalocyanine pigments, anthraquinone pigments, quinacridone pigments, dioxazine pigments, indigo pigments, thioindigo pigments, perylene pigments, isoindolinon pigments, aniline black, azomethine pigments, Rhodamine B Lake pigments, and carbon black are exemplified. As inorganic pigments, iron oxides, titanium oxides, calcium carbonate, barium sulfate, aluminum hydroxide, barium yellow, iron blue, cadmium red, chrome yellow, and metal powder are exemplified.

A pigment available for yellow ink is not particularly limited and may be suitably selected in accordance with the intended use. Examples thereof include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

A pigment available for magenta ink is not particularly limited and may be suitably selected in accordance with the intended use. Examples thereof include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

Examples of a pigment available for cyan ink include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Bat Blue 4, and C.I. Bat Blue 60.

For the pigments contained in each ink used in the present invention, those newly produced for the present invention are usable.

By using C.I. Pigment Yellow 74 as a yellow pigment, using C.I. Pigment Red 122 or C.I. Pigment Violet 19 as a magenta pigment, using C.I. Pigment Blue 15 as a cyan pigment, inks which are excellent in color toner, light resistance and are well-balanced can be obtained.

The concentration of the pigment in a pigment dispersion and the concentration of the pigment in a pigment ink are respectively preferably 0.1% by mass to 50.0% by mass, and more preferably 0.1% by mass to 20.0% by mass.

The average particle diameter (D50) of the pigment is preferably 150 nm or less, and more preferably 100 nm or less. The range of particle size distribution of pigment particles is preferably, as a standard deviation, the average particle diameter of the pigment or less than the average particle diameter, and more preferably half the average particle diameter of the pigment or less than half the average particle diameter. Here, the average particle diameter of the pigment indicates a value measured by dynamic light scattering method using MICROTRACK UPA manufactured by NIKKISO CO., LTD. under an environment of temperature of 23° C. and relative humidity of 55%. The reason for the above-noted requirement is that reducing the amount of pigment coarse particles in the ink adhered on the nozzle plate allows for preventing the ink repellent layer being impaired by friction of the coarse particles in the ink during wiping. Further, it can prevent diffused reflections of pigment particle in printed image parts and can also provide print images with uniform image density.

As for the number of coarse particles in the inkjet recording ink, the number of coarse particles having a diameter of 5.0 µm or more is preferably less than 50, and is more preferably less than 30. Here, the number of coarse particles indicates a value that the number of coarse particles in 5.0 µL of an ink measured, for example, ACCUSIZER 780A manufactured by Particle Sizing Systems Inc. The number of coarse particles is preferably within the above-noted range even with a state where moisture in the ink is evaporated.

The water-based pigment dispersion can be prepared, for example, by the following method. First, the ratio of a pigment and a nonionic surfactant should be determined. While dispersing a mixture of a pigment and water in a conventional dispersing apparatus such as sand mill, roll mill, bead mill, NANOMIZER, and HOMOGENIZER, a nonionic surfactant is gradually added to the mixture to determine a ratio of which the mixture has the lowest viscosity as well as the particle diameter thereof is small. When the mixture is dispersed in a bead mill, it is preferable to add a small amount of an anti-foaming agent to prevent generation of bubbles. The average particle diameter of the pigment can be controlled depending on the size of beads put in a dispersing apparatus and the dispersion time, and to make the average particle diameter of the pigment 150 nm or less, beads having an average particle diameter of 0.05 mm to 1.0 mm may be used, and the dispersion time may be set to 1 hr/L to 100 hr/L.

To the water-based pigment dispersion, ink components (for example, wetting agent, surfactant, pH adjustor, preservative, and anti-fungal agent), which will be hereinafter described, are added and the ink components are stirred at 200 to 30° for 1 hour to 3 hours, thereby a water-based pigment ink of the present invention can be obtained.

—Wetting Agent—

It is preferable to contain a wetting agent in the inkjet recording ink. When the wetting agent is contained in a water-based pigment ink, water retention and wettability of the ink composition can be ensured. Consequently, even when the water-based pigment ink is stored for a long period of time, excellent storage stability can be achieved without causing flocculation of coloring materials and viscosity increases. In addition, it is possible to achieve an inkjet recording ink capable of keeping flowability of dry materials therein for a long period of time even when stored in a state where the tip of a nozzle is opened in an inkjet printer in a state where the tip of a nozzle is opened. Further, highly reliable discharge stability can be obtained without causing nozzle clogging during printing or at restart of an inkjet printer after printing discontinuation.

The wetting agent is not particularly limited and may be suitably selected in accordance with the intended use. Examples thereof include polyvalent alcohols such as ethylene glycol, diethylene glycol, 1,3-butyl glycol, 3-methyl-1,3-butyl glycol, triethylene glycol, polyethylene glycol, polypropylene glycol, 1,5-pentanediol, 1,6-hexanediol, glycerine, 1,2,6-hexanetriol, 2-ethyl-1,3-hexanediol, ethyl 1,2,4-butanetriol, 1,2,3-butanetriol, and petriol; polyvalent alcohol alkyl ethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethyl ether; polyvalent alcohol aryl ethers such as ethylene glycol monophenylether, and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethylimidazoridinone, ε-caprolactam, and γ-butyrolactam; amides such as formamide, N-methylformamide, and N,N-dimethylformamide; amines such as monoethanolamine, diethanolamine, and triethylamine; sulfur-containing compounds such as dimethylsulfoxide, sulfolane, and thiodiethanol; propylene carbonate, and ethylene carbonate. Each of these wetting agents may be used alone or in combination with two or more.

An inkjet recording ink containing at least any one of 1,3-butyl glycol, diethylene glycol, triethylene glycol, and glycerine allows for obtaining excellent effects in terms of preventing nozzle clogging due to ink drying i.e. degradation of ejecting property of the ink due to moisture vaporization and improvements in color saturation of formed images in the present invention.

The added amount of the wetting agent in the recording ink is preferably 0.1% by mass to 50% by mass, and more preferably 5% by mass to 40% by mass.

The other components are not particularly limited, may be appropriately selected in accordance with the necessity, and examples thereof include anti-foaming agents, pH adjustors preservatives/anti-fungal agents, antirusts, antioxidants, ultraviolet ray absorbers, oxygen absorbers, photo stabilizers.

The anti-foaming agent is not particularly limited, may be suitably selected in accordance with the intended use, and preferred examples thereof include silicone-based anti-foaming agents, polyether-based anti-foaming agents and fatty acid ester-based anti-foaming agents. These may be used alone or in combination of two or more. Of these, the silicone-based anti-foaming agent is preferable in terms of being excellent in foam breaking effect.

Examples of the preservatives/anti-fungal agents include 1,2-benzisothiazoline-3-one, sodium dehydroacetate, sodium sorbate, sodium 2-pyridinethiol-2-oxide, sodium benzoate and sodium pentachlorophenol.

The pH adjuster is not particularly limited and may be suitably selected in accordance with the intended use as long as it can adjust pH to 7 or more without harmfully affecting the prepared recording ink, and examples thereof include amines such as dimethanol amine, and triethanol amine; hydroxides of alkali metals such as lithium hydroxide, sodium hydroxide, and potassium hydroxide; and carbonate salts of alkali metals such as ammonium hydroxide, quaternary ammonium hydroxide, quaternary phosphonium hydroxide, lithium carbonate, sodium carbonate, and potassium carbonate.

Examples of the antirusts include acidic sulfite salts, sodium thiosulfate, ammonium thiodiglycolate, diisopropylammonium nitrate, pentaerythritol tetranitrate and dicyclohexylammonium nitrate.

Examples of the antioxidants include phenol-based antioxidants (including hindered phenol-based antioxidants), amine-based antioxidants, sulfur-based antioxidants and phosphorous-based antioxidants.

EXAMPLES

Hereafter, the present invention will be further described in detail referring to specific Examples and Comparative Examples, however, the present invention is not limited to the disclosed Examples.

Example 1

Preparation of Pigment Dispersion (a)

| | |
|---|---|
| C.I. Pigment Red 122 (FASTOGEN SUPER MAGENTA RG, manufactured by Dainippon Ink and Chemicals, Inc.) | 150 parts by mass |
| Nonionic surfactant (polyoxyethylene (n = 40) β-naphthyl ether) | 113 parts by mass |
| Distilled water | 737 parts by mass |

After premixing the above-noted components, the premixed components were circulated and dispersed in a disc type bead mill (KDL model, manufactured by Shinmaru Enterprises Corporation; media: zirconia ball having a diameter of 0.3 mm was used) for 7 hours to yield a pigment dispersion (a). The pigment dispersion (a) had an average particle diameter of 90 nm.

<Preparation of Ink (A)>

| | |
|---|---|
| Pigment dispersion (a) | 50 parts by mass |
| Glycerine | 10 parts by mass |
| Diethylene glycol | 20 parts by mass |
| Fluorochemical surfactant represented by the following Formula (2) (FS-300, manufactured by DuPont Co.) | 2 parts by mass |

$$CF_3CF_2(CF_2CF_2)_m—CH_2CH_2O(CH_2CH_2O)_nH \qquad \text{Formula (2)}$$

In Formula (2), "m" is an integer of 6 to 8, and "n" is an integer of 26 or more.

| | |
|---|---|
| 1,2-benzothiazolone-based preservative/antifungal agent (PROXEL LV, manufactured by AVECIA Co.) | 0.5 parts by mass |
| Polyurethane resin emulsion (anionic self-emulsifiable ether-polyurethane resin emulsion, W5661, manufactured by MITSUI CHEMICALS POLYURETHANES, INC.) | 2.5 parts by mass |
| Ion exchange water | 15 parts by mass |

An inkjet recording ink was prepared with the above-noted formulation, the materials were stirred for 2 hours, the mixture was filtered through a membrane filter having a hole diameter of 0.8 µm to thereby obtain each inkjet recording ink.

The blending order of the components for the inkjet recording ink is as follows. (1) glycerine and diethylene glycol, (2) fluorochemical surfactant, (3) PROXEL LV, (4) ion exchange water. These components were stirred for 30 minutes, and then the pigment dispersion (a) was added to the mixture, the mixture was stirred for 30 minutes, the resin emulsion was added to the mixture. Finally, the mixture was stirred for 1 hour to thereby prepare the inkjet recording ink.

<Preparation of Nozzle Plate Coated with Silicone>

Over the surface of an Ni-electroformed nozzle, a silicone resin (SR2411, manufactured by DOW CORNING TORAY SILICONE CO., LTD.) was applied by spraying to form a silicone layer having a thickness of 1.2 µm. Specifically, a nozzle hole and the back face of the nozzle plate were masked with a water-soluble resin, the nozzle surface was coated with the silicone resin to form a silicone layer, and then the water-soluble resin was peeled off and removed from the nozzle. The silicone layer was left intact at room temperature for 2 days and hardened to thereby form an ink repellent layer on the nozzle surface.

The ink repellent layer had a surface roughness (Ra) of 0.18 µm, and a critical surface tension of 21.6 mN/m.

Here, the thickness of the ink repellent layer was measured using an optical film thickness meter (LAMBDA ACE VM-8000J manufactured by Dainippon Screen Mfg Co., Ltd.).

The surface roughness (Ra) of the ink repellent layer was measured using a tracer type surface roughness meter (DEKTAK3-ST manufactured by Veeco Instruments Inc.).

The critical surface tension of the ink repellent layer was measured by Zisman method.

<Evaluation of Contact Angle>

The nozzle plate was evaluated as to mechanical durability by comparing the contact angle of the ink (A) measured at the initial stage with the contact angle of the ink (a) measured after wiping the nozzle plate 3,000 times using a wiper blade (EPDM rubber hardness=70°) as a receding contact angle.

<Evaluation of Discharge Stability>

Using the nozzle plate whose surface was wiped 3,000 times, an inkjet head was prepared. The inkjet head was mounted in a printer (IPSiO G707, manufactured by Ricoh Company Ltd.) shown in FIGS. 1, 2, and 3. Then, the inkjet head was filled with the prepared inkjet recording ink, and the discharge stability was evaluated according to the following procedures. Table 1 shows the evaluation results.

Specifically, after successively outputting 20 sheets of the following print pattern chart, printing operation was stopped for 20 minutes; the above-noted process was repeated 50 times to thereby print 1,000 sheets in total of the pattern chart; thereafter, one more sheet of the same pattern chart was printed out; and the last printed sheet was visually checked as to presence or absence of streaks, white spots, and disturbed discharge in solid parts of the 5% chart and evaluated based on the following criteria. The print pattern was of a chart of which the printed area was 5% in the image area and the each color-printed area in respective colors was 5% in the total area of the paper, and the chart was printed with the respective color inks at 100% duty cycle. For the printing conditions, the recording density was set to 360 dpi, and the print mode was set to one-pass printing.

A: No streak, white spot, and disturbed discharge was observed in the solid parts.

B: A slight amount of streaks, white spots, and/or disturbed discharge was observed in the solid parts.

C: Streaks, white spots, and/or disturbed discharge were observed throughout the solid part area.

"A" indicates a condition where the inkjet recording ink was normally discharged, and "B" and "C" respectively indicate defective discharge of the inkjet recording ink. It is conceivable that the results of B and C are attributable to a decreased receding contact angle of the ink due to wiping of the nozzle plate i.e. degradation of the ink repellent layer.

Example 2

An inkjet recording ink was prepared in the same manner as in Example 1 except that the pigment dispersion and the ink were respectively changed to the following pigment dispersion (b) and ink (B). The inkjet recording ink was evaluated in the same manner as in Example 1. Table 1 shows the evaluation result.

Preparation of Pigment Dispersion (b)

| | |
|---|---|
| C.I. Pigment Blue 15:3 (Cyanin Blue A-292, manufactured by Dainippon Seika Kogyo K.K.) | 150 parts by mass |
| Nonionic surfactant (polyoxyethylene (n = 20) β-naphthyl ether) | 122 parts by mass |
| Anionic surfactant (PIONINE A-51-B, manufactured by Takemoto Oil & Fat Co., Ltd.) | 2 parts by mass |
| Distilled water | 726 parts by mass |

After premixing the above-noted components, the premixed components were circulated and dispersed in a disc type bead mill (KDL model, manufactured by Shinmaru Enterprises Corporation; media: zirconia ball having a diameter of 0.3 mm was used) for 7 hours to yield a pigment dispersion (b). The pigment dispersion (b) had an average particle diameter of 90 nm.

<Preparation of Ink (B)>

| | |
|---|---|
| Pigment dispersion (b) | 38 parts by mass |
| Glycerine | 10 parts by mass |
| Diethylene glycol | 20 parts by mass |
| Fluorochemical surfactant represented by the following Formula (3) | 1 part by mass |

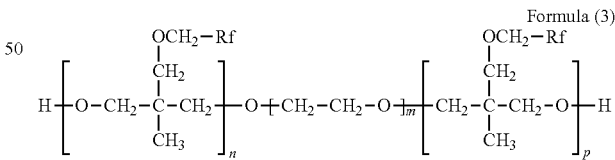

In Formula (3), "n" is an integer of 4, "m" is an integer of 21, "p" is an integer of 4, and Rf is $CF_2CF_3$.

| | |
|---|---|
| PROXEL LV (manufactured by AVECIA Co.) | 0.5 parts by mass |
| Polyurethane resin emulsion (anionic self-emulsifiable polycarbonate-based polyurethane resin emulsion, SF460S, manufactured by Nippon Unicar Co., Ltd.) | 2.5 parts by mass |
| Ion exchange water | 28 parts by mass |

Example 3

An inkjet recording ink was prepared in the same manner as in Example 1 except that the ink was changed to the following ink (C). The inkjet recording ink was evaluated in the same manner as in Example 1. Table 1 shows the evaluation result.

<Preparation of Ink (C)>

| | |
|---|---|
| Pigment dispersion (a) | 50 parts by mass |
| Glycerine | 10 parts by mass |
| Diethylene glycol | 20 parts by mass |
| Fluorochemical surfactant represented by the following Formula (2) (FSN-100, manufactured by DuPont Co.) | 2 parts by mass |

$$CF_3CF_2(CF_2CF_2)_m\text{—}CH_2CH_2O(CH_2CH_2O)_nH \qquad \text{Formula (2)}$$

In Formula (2), "m" is an integer of 1 to 9, and "n" is an integer of 0 to 25.

| | |
|---|---|
| PROXEL LV (manufactured by AVECIA Co.) | 0.5 parts by mass |
| Styrene-acrylic resin emulsion (J-450, manufactured by Johnson Polymer Inc.) | 2.5 parts by mass |
| Ion exchange water | 15 parts by mass |

Example 4

An inkjet recording ink was prepared in the same manner as in Example 1 except that the pigment dispersion and the ink were respectively changed to the following pigment dispersion (c) and ink (D). The inkjet recording ink was evaluated in the same manner as in Example 1. Table 1 shows the evaluation result.

Preparation of Pigment Dispersion (c)

| | |
|---|---|
| C.I. Pigment Yellow 74 (Yellow No. 43, manufactured by Dainippon Seika Kogyo K.K.) | 150 parts by mass |
| Polyoxyethylene (n = 7) octyl ether | 100 parts by mass |
| Distilled water | 750 parts by mass |

After premixing the above-noted components, the premixed components were circulated and dispersed in a disc type bead mill (KDL model, manufactured by Shinmaru Enterprises Corporation; media: zirconia ball having a diameter of 0.3 mm was used) for 7 hours to yield a pigment dispersion (c). The pigment dispersion (c) had an average particle diameter of 90 nm.

<Preparation of Ink (D)>

| | |
|---|---|
| Pigment dispersion (c) | 37 parts by mass |
| Glycerine | 10 parts by mass |
| Diethylene glycol | 20 parts by mass |
| Fluorochemical surfactant represented by the following Formula (3) | 1 part by mass |

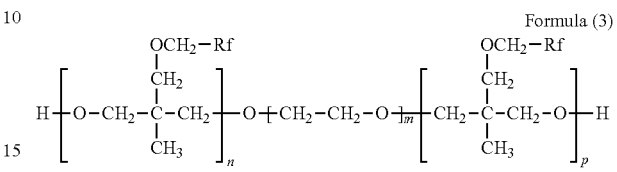

Formula (3)

In Formula (3), "n" is an integer of 4, "m" is an integer of 21, "p" is an integer of 4, and Rf is $CF_2CF_3$.

| | |
|---|---|
| PROXEL LV (manufactured by AVECIA Co.) | 0.5 parts by mass |
| Acrylic silicone resin emulsion (AP4710, manufactured by SHOWA HIGHPOLYMER CO., LTD.) | 2.5 parts by mass |
| Ion exchange water | 29 parts by mass |

Example 5

An inkjet recording ink was prepared in the same manner as in Example 1 except that the ink was changed to the following ink (E). The inkjet recording ink was evaluated in the same manner as in Example 1. Table 1 shows the evaluation result.

<Preparation of Ink (E)>

| | |
|---|---|
| Pigment dispersion (a) | 50 parts by mass |
| Glycerine | 10 parts by mass |
| Diethylene glycol | 20 parts by mass |
| Fluorochemical surfactant represented by the following Formula (2) (FS-300, manufactured by DuPont Co.) | 2 parts by mass |

$$CF_3CF_2(CF_2CF_2)_m\text{—}CH_2CH_2O(CH_2CH_2O)_nH \qquad \text{Formula (2)}$$

In Formula (2), "m" is an integer of 6 to 8, and "n" is an integer of 26 or more.

| | |
|---|---|
| PROXEL LV (manufactured by AVECIA Co.) | 0.5 parts by mass |
| Ion exchange water | 17.5 parts by mass |

Comparative Example 1

An inkjet recording ink was prepared in the same manner as in Example 1 except that the pigment dispersion and the ink were respectively changed to the following pigment dispersion (d) and ink (F). The inkjet recording ink was evaluated in the same manner as in Example 1. Table 1 shows the evaluation result.

Preparation of Pigment Dispersion (d)

| | |
|---|---|
| C.I. Pigment Red 122 (FASTOGEN SUPER MAGENTA RG, manufactured by Dainippon Ink and Chemicals, Inc.) | 150 parts by mass |
| Water-soluble styrene-acrylic resin (HPD-71, manufactured by Johnson Polymer Inc.) | 22 parts by mass |
| Distilled water | 828 parts by mass |

After premixing the above-noted components, the premixed components were circulated and dispersed in a disc type bead mill (KDL model, manufactured by Shinmaru Enterprises Corporation; media: zirconia ball having a diameter of 0.3 mm was used) for 7 hours to yield a pigment dispersion (d). The pigment dispersion (d) had an average particle diameter of 90 nm.

<Preparation of Ink (F)>

| | |
|---|---|
| Pigment dispersion (d) | 50 parts by mass |
| Glycerine | 10 parts by mass |
| Diethylene glycol | 20 parts by mass |
| Fluorochemical surfactant represented by the following Formula (2) (FS-300, manufactured by DuPont Co.) | 2 parts by mass |

$$CF_3CF_2(CF_2CF_2)_m\text{—}CH_2CH_2O(CH_2CH_2O)_nH \quad \text{Formula (2)}$$

In Formula (2), "m" is an integer of 6 to 8, and "n" is an integer of 26 or more.

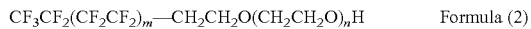

| | |
|---|---|
| PROXEL LV (manufactured by AVECIA Co.) | 0.5 parts by mass |
| Ion exchange water | 17.5 parts by mass |

Comparative Example 2

An inkjet recording ink was prepared in the same manner as in Example 2 except that the pigment dispersion and the ink were respectively changed to the following pigment dispersion (e) and ink (G). The inkjet recording ink was evaluated in the same manner as in Example 1. Table 1 shows the evaluation result.

Preparation of Pigment Dispersion (e)

| | |
|---|---|
| C.I. Pigment Blue 15:3 (Cyanin Blue A-292, manufactured by Dainippon Seika Kogyo K.K.) | 150 parts by mass |
| Water-soluble styrene-acrylic resin (HRC-1645, manufactured by Johnson Polymer Inc.) | 20 parts by mass |
| Anionic surfactant (PIONINE A-51-B, manufactured by Takemoto Oil & Fat Co., Ltd.) | 2 parts by mass |
| Distilled water | 828 parts by mass |

After premixing the above-noted components, the premixed components were circulated and dispersed in a disc type bead mill (KDL model, manufactured by Shinmaru Enterprises Corporation; media: zirconia ball having a diameter of 0.3 mm was used) for 7 hours to yield a pigment dispersion (e). The pigment dispersion (e) had an average particle diameter of 90 nm.

<Preparation of Ink (G)>

| | |
|---|---|
| Pigment dispersion (e) | 38 parts by mass |
| Glycerine | 10 parts by mass |
| Diethylene glycol | 20 parts by mass |
| Fluorochemical surfactant represented by the following Formula (3) | 1 part by mass |

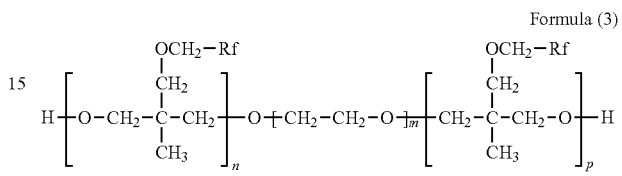

Formula (3)

In Formula (3), "n" is an integer of 4, "m" is an integer of 21, "p" is an integer of 4, and Rf is $CF_2CF_3$.

| | |
|---|---|
| PROXEL LV (manufactured by AVECIA Co.) | 0.5 parts by mass |
| Ion exchange water | 30.5 parts by mass |

Comparative Example 3

An inkjet recording ink was prepared in the same manner as in Example 3 except that the pigment dispersion and the ink were respectively changed to the following pigment dispersion (f) and ink (H). The inkjet recording ink was evaluated in the same manner as in Example 1. Table 1 shows the evaluation result.

Preparation of Pigment Dispersion (f)

As a magenta pigment, a pigment with a carboxylic acid group introduced thereto was prepared by subjecting C.I. Pigment Red 122 to a low-temperature plasma treatment. The pigment was dispersed in ion exchange water, and the pigment dispersion was concentrated by means of desalination through an ultrafiltration membrane to thereby yield a magenta pigment dispersion with a pigment concentration of 15%. This was taken as magenta pigment dispersion (f).

<Preparation of Ink (H)>

| | |
|---|---|
| Pigment dispersion (f) | 46 parts by mass |
| Glycerine | 10 parts by mass |
| Diethylene glycol | 20 parts by mass |
| Fluorochemical surfactant represented by the following Formula (2) (FSN-100, manufactured by DuPont Co.) | 2 parts by mass |

$$CF_3CF_2(CF_2CF_2)_m\text{—}CH_2CH_2O(CH_2CH_2O)_nH \quad \text{Formula (2)}$$

In Formula (2), "m" is an integer of 1 to 9, and "n" is an integer of to 25.

| | |
|---|---|
| PROXEL LV (manufactured by AVECIA Co.) | 0.5 parts by mass |
| Styrene-acrylic resin emulsion (J-450, manufactured by Johnson Polymer Inc.) | 2.5 parts by mass |
| Ion exchange water | 19 parts by mass |

Comparative Example 4

An inkjet recording ink was prepared in the same manner as in Example 4 except that the pigment dispersion and the ink were respectively changed to the following pigment dispersion (g) and ink (I). The inkjet recording ink was evaluated in the same manner as in Example 1. Table 1 shows the evaluation result.

Preparation of Pigment Dispersion (g)

As a yellow pigment, a pigment with a carboxylic acid group introduced thereto was prepared by subjecting C.I. Pigment Yellow 74 to a low-temperature plasma treatment. The pigment was dispersed in ion exchange water, and the pigment dispersion was concentrated by means of desalination through an ultrafiltration membrane to thereby yield a yellow pigment dispersion with a pigment concentration of 15%. This was taken as yellow pigment dispersion (g).

<Preparation of Ink (I)>

| | |
|---|---|
| Pigment dispersion (g) | 33 parts by mass |
| Glycerine | 10 parts by mass |
| Diethylene glycol | 20 parts by mass |
| Fluorochemical surfactant represented by the following Formula (3) | 1 part by mass |

Formula (3)

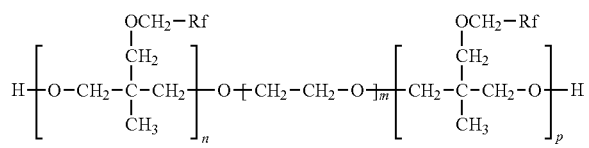

In Formula (3), "n" is an integer of 4, "m" is an integer of 21, "p" is an integer of 4, and Rf is $CF_2CF_3$.

| | |
|---|---|
| PROXEL LV (manufactured by AVECIA Co.) | 0.5 parts by mass |
| Acrylic silicone resin emulsion (AP4710, manufactured by SHOWA HIGHPOLYMER CO., LTD.) | 2.5 parts by mass |
| Ion exchange water | 33 parts by mass |

Comparative Example 5

An inkjet recording ink was prepared in the same manner as in Example 5 except that the pigment dispersion and the ink were respectively changed to the following pigment dispersion (h) and ink (J). The inkjet recording ink was evaluated in the same manner as in Example 1. Table 1 shows the evaluation result.

Preparation of Pigment Dispersion (h)

With reference to Preparation Example 3 in Japanese Patent Application Laid-Open (JP-A) No. 2001-139849, a polymer fine particle dispersion containing a magenta pigment was prepared.

First, as preparation of a polymer solution, the inside of a 1 L flask equipped with a mechanical stirrer, a thermometer, a nitrogen gas inlet tube, a reflux tube, and a dripping funnel was sufficiently substituted with nitrogen gas. Then, 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by TOAGOSEI CO., LTD.) and 0.4 g of mercapto ethanol were put in the flask, and the temperature of the components was raised to 65° C. Next, a mixture solution of 100.8 g of styrene, 25.2 g of acrylic acid, 108.0 g of lauryl methacrylate, 36.0 g of polyethylene glycol methacrylate, 60.0 g of hydroxy ethyl methacrylate, 36.0 g of styrene macromer (trade name: AS-6, manufactured by ToaGosei Co., Ltd.), 3.6 g of mercapto ethanol, 2.4 g of azobis dimethylvaleronitrile, and 18 g of methylethylketone was delivered by drops into the flask in 2.5 hours. After dripping the mixture solution, another mixture solution of 0.8 g of azobis dimethylvaleronitrile and 18 g of methylethylketone was delivered by drops into the flask in 0.5 hours. The mixture solution was aged at 65° C. for 1 hour, and then 0.8 g of azobis dimethylvaleronitrile was added thereto, and the mixture solution was further aged for 1 hour. Upon completion of the reaction, 364 g of methylethylketone was added into the flask to thereby obtain 800 g of a polymer solution with a concentration of 50% by mass. Then, 28 g of the obtained polymer solution, 26 g of Pigment Red 122, 13.6 g of 1 mol/L potassium hydroxide aqueous solution, 20 g of methylethylketone, and 30 g of ion exchange were sufficiently stirred. Thereafter, the mixture was kneaded 20 times using a three roll mill (trade name: NR-84A, manufactured by Noritake Co., Ltd. The obtained paste was put in 200 g of ion exchange water, sufficiently stirred, and then put in an evaporator to distil away the methylethylketone and water therein to thereby obtain 160 g of a magenta color polymer fine particle dispersion with a solid content of 20.0% by mass (h).

<Preparation of Ink (J)>

| | |
|---|---|
| Pigment dispersion (h) | 40 parts by mass |
| Glycerine | 10 parts by mass |
| Diethylene glycol | 20 parts by mass |
| Fluorochemical surfactant represented by the following Formula (2) (FS-300, manufactured by DuPont Co.) | 2 parts by mass |

$$CF_3CF_2(CF_2CF_2)_m\text{---}CH_2CH_2O(CH_2CH_2O)_nH \qquad \text{Formula (2)}$$

In Formula (2), "m" is an integer of 6 to 8, and "n" is an integer of 26 or more.

| | |
|---|---|
| PROXEL LV (manufactured by AVECIA Co.) | 0.5 parts by mass |
| Ion exchange water | 27.5 parts by mass |

TABLE 1

| | Receding contact angle (at initial stage) | Receding contact angle (after wiping nozzle plate 3,000 times) | Discharge stability |
|---|---|---|---|
| Ex. 1 | 52.4 | 51.0 | A |
| Ex. 2 | 51.3 | 50.2 | A |
| Ex. 3 | 51.8 | 50.6 | A |
| Ex. 4 | 48.7 | 46.4 | B |
| Ex. 5 | 49.6 | 48.7 | B |
| Compara. Ex. 1 | 47.2 | 30.4 | C |
| Compara. Ex. 2 | 47.6 | 31.7 | C |
| Compara. Ex. 3 | 46.5 | 33.1 | C |
| Compara. Ex. 4 | 46.9 | 32.9 | C |
| Compara. Ex. 5 | 47.3 | 32.4 | C |

The invention claimed is:

1. An inkjet recording method, comprising:
flying an inkjet recording ink by applying an impulse to the inkjet recording ink to form an image,
wherein the nozzle plate of an inkjet head used in the flying of the inkjet recording ink has an ink repellent layer comprising a silicone resin; and the inkjet recording ink comprises at least a pigment, water, a fluorochemical surfactant, and a nonionic surfactant,
wherein an angle θ formed between the tangential line passing at the outside edge of the opening of the ink repellent layer and the surface of the nozzle plate is less than 90 degrees, and a curvature radius r of a curve near the opening of the ink repellant layer is greater than the thickness d of portions of the ink repellent layer other than the neighborhood of the opening of the ink repellent layer.

2. The inkjet recording method according to claim 1, wherein the nonionic surfactant is a compound represented by the following Formula (1):

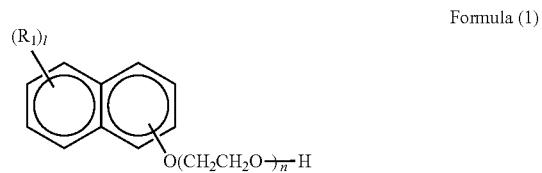
Formula (1)

where $R_1$ represents an alkyl group, an allyl group, or an aralkyl group each having 1 to 20 carbon atoms, "l" is an integer of 0 to 7, and "n" is an integer of 20 to 200.

3. The inkjet recording method according to claim 1, wherein the nonionic surfactant is polyoxyethylene (n=40) β-naphthyl ether.

4. The inkjet recording method according to claim 1, wherein the fluorochemical surfactant comprises a compound represented by the following Formula (2):

$$CF_3CF_2(CF_2CF_2)_m\text{---}CH_2CH_2O(CH_2CH_2O)_nH \qquad \text{Formula (2)}$$

where "m" is an integer of 0 to 10, and "n" is an integer of 0 to 40.

5. The inkjet recording method according to claim 1, wherein the fluorochemical surfactant comprises a compound represented by the following Formula (3):

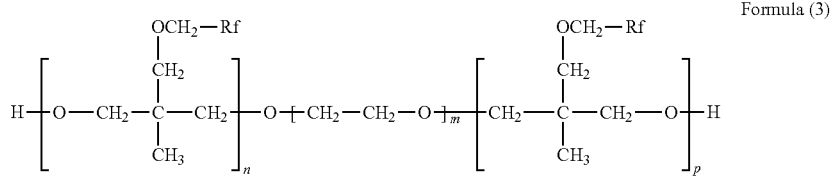
Formula (3)

where Rf represents a fluorine containing group, and "m", "n", and "p" are respectively an integer.

6. The inkjet recording method according to claim 5, wherein, in the compound represented by Formula (3),
"m" is an integer from 6 to 25,
"n" is an integer from 1 to 4, and
"p" is an integer from 1 to 4.

7. The inkjet recording method according to claim 1, wherein the inkjet recording ink comprises a resin emulsion.

8. The inkjet recording method according to claim 7, wherein the resin emulsion comprises at least one emulsion selected from a polyurethane resin emulsion, a styrene-acrylic resin emulsion, and an acrylic silicone resin emulsion.

9. The inkjet recording method according to claim 8, wherein the polyurethane resin emulsion is a self-emulsifiable anionic ether-based polyurethane resin emulsion.

* * * * *